(12) United States Patent
Haytayan

(10) Patent No.: US 7,377,019 B2
(45) Date of Patent: May 27, 2008

(54) METHOD AND APPARATUS FOR FASTENING TOGETHER STRUCTURAL COMPONENTS

(76) Inventor: Harry M. Haytayan, 32 Indian Rock Rd., Nashua, NH (US) 03063

(*) Notice: Subject to any disclaimer, the term of this patent is extended or adjusted under 35 U.S.C. 154(b) by 18 days.

(21) Appl. No.: 11/168,852

(22) Filed: Jun. 28, 2005

(65) Prior Publication Data

US 2005/0235779 A1 Oct. 27, 2005

Related U.S. Application Data

(60) Division of application No. 10/619,374, filed on Jul. 11, 2003, now Pat. No. 6,990,731, which is a continuation-in-part of application No. 10/195,207, filed on Jul. 15, 2002, now abandoned.

(51) Int. Cl.
*B23P 11/00* (2006.01)
*B25B 21/02* (2006.01)
*F16B 15/02* (2006.01)

(52) U.S. Cl. .................. 29/432; 29/525.01; 29/525.11; 173/1; 173/93.6; 173/93.7; 81/464; 81/463; 411/387.1; 411/387.2; 411/387.5; 411/387.8; 411/442

(58) Field of Classification Search .................. 29/432, 29/525.01, 525.08, 525.11, 26 A, 34 B, 243.53; 173/1, 4, 93.7, 93.6; 81/464, 463; 411/386, 411/387.1, 387.2, 387.5, 387.6, 387.7, 387.8, 411/399, 442
See application file for complete search history.

(56) References Cited

U.S. PATENT DOCUMENTS

| | | | | |
|---|---|---|---|---|
| 2,990,739 A | * | 7/1961 | Zifferer | 173/29 |
| 3,056,234 A | * | 10/1962 | Nelsson et al. | 52/363 |
| 3,221,588 A | * | 12/1965 | Wieber | 411/387.1 |
| 3,349,651 A | * | 10/1967 | Turnbull et al. | 81/464 |
| 3,358,548 A | * | 12/1967 | Dyslin | 411/387.2 |
| 3,478,639 A | * | 11/1969 | Gruca | 411/387.1 |
| 3,550,243 A | * | 12/1970 | Allsop | 29/240 |
| 3,665,801 A | * | 5/1972 | Gutshall | 411/387.7 |
| 3,710,676 A | * | 1/1973 | Ringland | 411/387.7 |
| 3,933,075 A | | 1/1976 | Peterson | |
| 3,942,405 A | * | 3/1976 | Wagner | 411/386 |
| 3,982,464 A | * | 9/1976 | Sygnator | 411/418 |
| 4,098,354 A | * | 7/1978 | Alcenius | 173/93.5 |

(Continued)

FOREIGN PATENT DOCUMENTS

JP 09285971 A * 11/1997

(Continued)

*Primary Examiner*—Essama Omgba
(74) *Attorney, Agent, or Firm*—Pandiscio & Pandiscio

(57) ABSTRACT

A method and apparatus for fastening a first relatively soft structural component such as a wood panel to a second relatively hard structural component such as a steel angle iron using fasteners each having a forward self-drilling portion, a rearward, self-tapping portion, and an outwardly projecting head. The fasteners are driven by a pneumatic rotary impact driver and the method comprises rotatively driving each fastener so as to cause its self-drilling portion to drill a first hole through the wood panel and thereafter rotatively driving and impacting that fastener so as to cause its self-drilling portion to drill a second hole in the angle iron and its self-tapping portion to form a screw connection with the angle iron around the second hole.

12 Claims, 17 Drawing Sheets

U.S. PATENT DOCUMENTS

| | | | |
|---|---|---|---|
| 4,106,618 A | | 8/1978 | Haytayan |
| 4,106,619 A | | 8/1978 | Haytayan |
| 4,161,242 A | * | 7/1979 | Moores et al. ............... 192/34 |
| 4,407,620 A | * | 10/1983 | Shinjo ..................... 411/387.7 |
| 4,586,862 A | * | 5/1986 | Yamasaki ............... 411/387.8 |
| 4,621,963 A | * | 11/1986 | Reinwall ..................... 411/369 |
| 4,645,396 A | * | 2/1987 | McCauley et al. ....... 411/387.2 |
| 4,773,111 A | | 9/1988 | Hyner et al. |
| 4,823,885 A | * | 4/1989 | Okumura .................... 173/178 |
| 5,046,905 A | * | 9/1991 | Piacenti et al. .......... 411/387.2 |
| 5,267,423 A | * | 12/1993 | Giannuzzi ..................... 52/410 |
| 5,343,961 A | * | 9/1994 | Ichikawa ..................... 173/48 |
| 5,366,082 A | | 11/1994 | Haytayan |
| 5,520,491 A | * | 5/1996 | Miyagawa ............... 411/387.8 |
| 5,522,687 A | * | 6/1996 | Chen ........................... 411/444 |
| 5,544,746 A | | 8/1996 | Dohi |
| 5,759,003 A | * | 6/1998 | Greenway et al. .......... 411/421 |
| 5,775,514 A | * | 7/1998 | Lin ............................. 206/347 |
| 5,987,837 A | * | 11/1999 | Nelson .................... 52/506.05 |
| 6,036,013 A | * | 3/2000 | Chen ........................... 206/347 |
| 6,050,765 A | * | 4/2000 | McGovern et al. ...... 411/387.2 |
| 6,139,236 A | | 10/2000 | Ito |
| 6,457,535 B1 | * | 10/2002 | Tanaka ......................... 173/48 |
| 6,620,011 B2 | * | 9/2003 | Obermeier et al. ......... 411/442 |
| 6,666,638 B2 | * | 12/2003 | Craven ........................ 411/413 |
| 6,676,353 B1 | * | 1/2004 | Haytayan ................... 411/442 |
| 6,811,366 B2 | * | 11/2004 | Chen ........................... 411/533 |
| 7,025,551 B2 | * | 4/2006 | Haytayan ................... 411/442 |
| 7,266,874 B2 | * | 9/2007 | Ernst et al. ................... 29/432 |
| 2005/0283961 A1 | * | 12/2005 | Ernst et al. ................... 29/432 |

FOREIGN PATENT DOCUMENTS

JP    2001088048 A  *  4/2001

\* cited by examiner

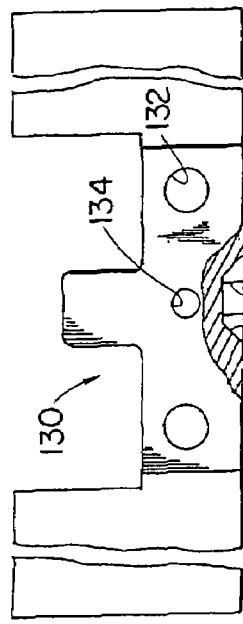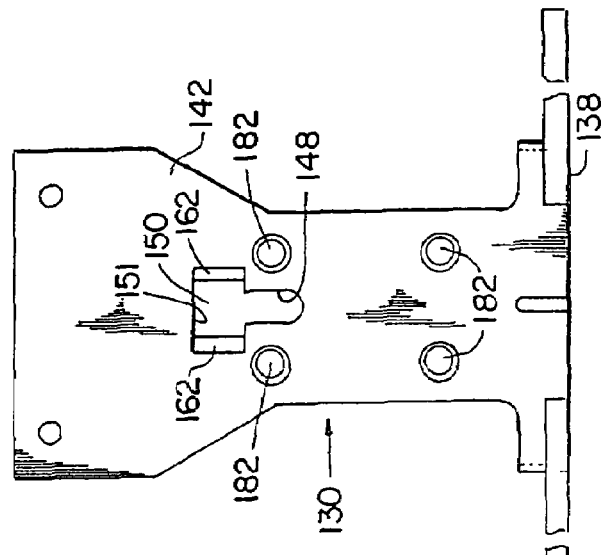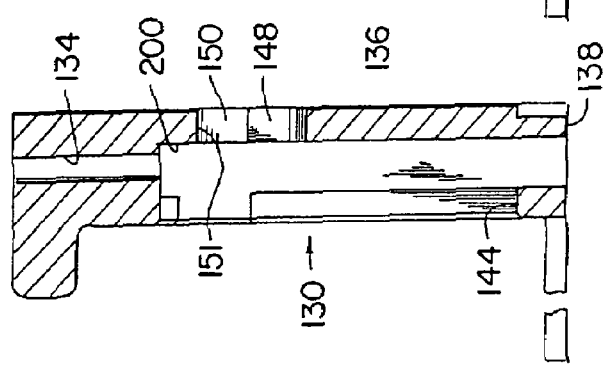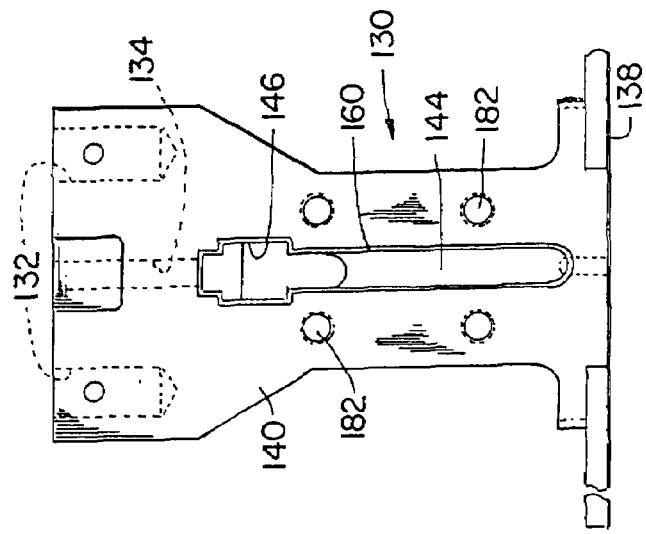

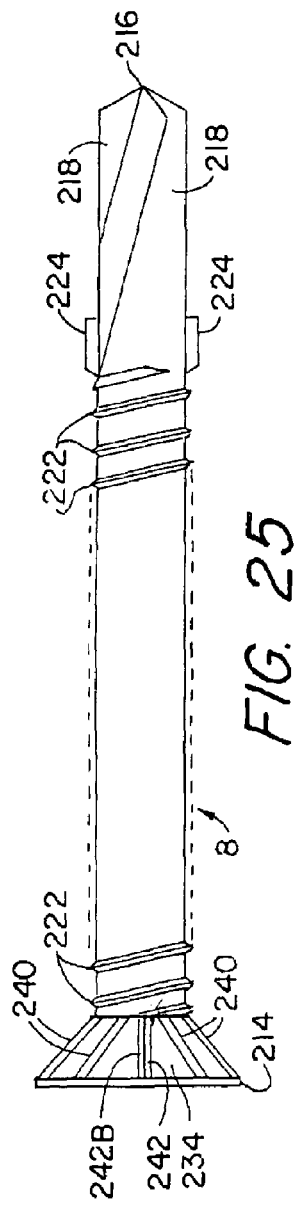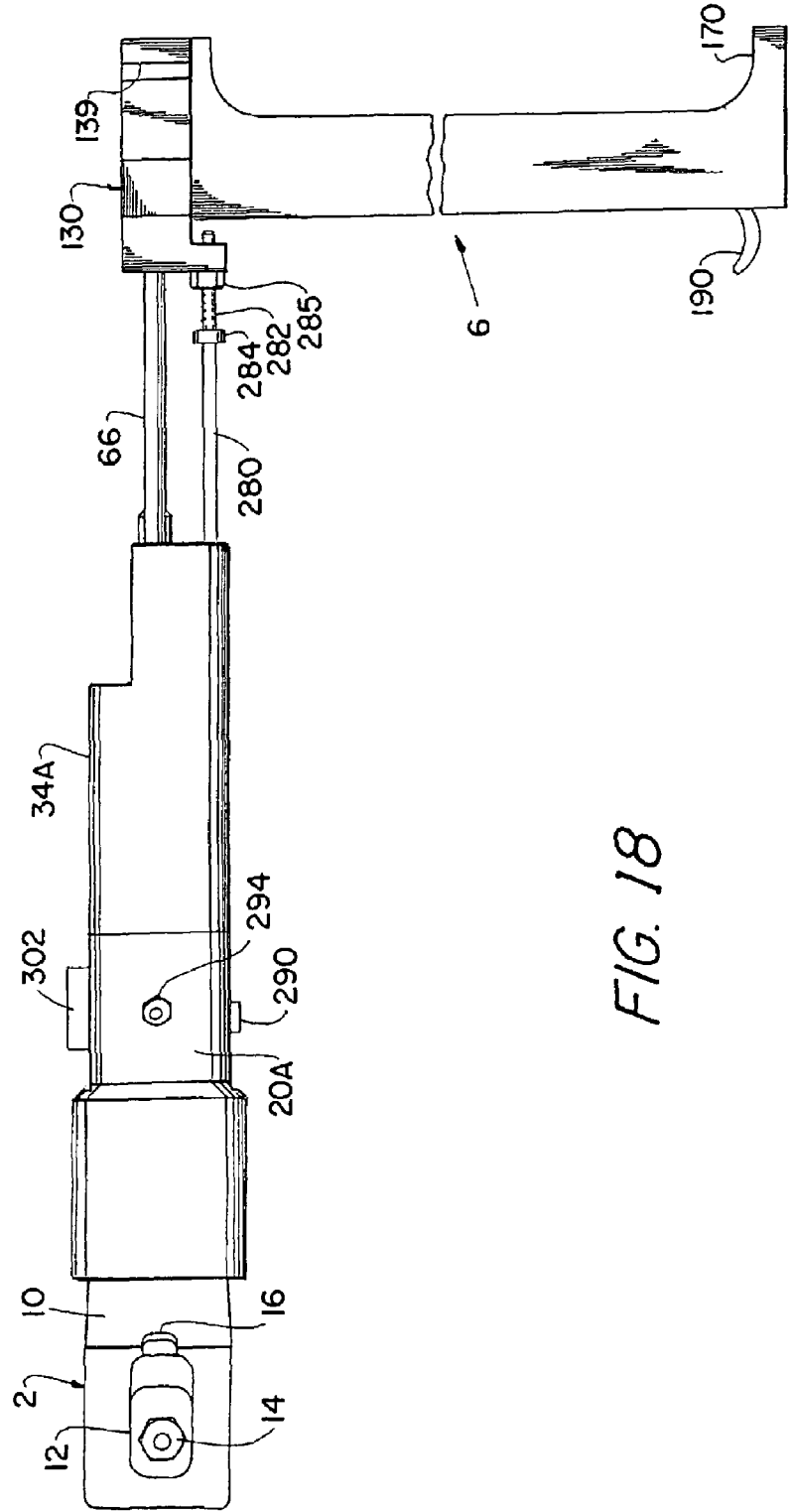
FIG. 25
FIG. 18

METHOD AND APPARATUS FOR FASTENING TOGETHER STRUCTURAL COMPONENTS

This is a division of prior U.S. patent application Ser. No. 10/619,374, filed Jul. 11, 2003 now U.S. Pat. No. 6,990,731 for "Method And Apparatus For Fastening Together Structural Components", which patent application is a continuation-in-part of U.S. patent application Ser. No. 10/195,207, filed Jul. 15, 2002 now abandoned for "Method And Apparatus For Attaching Structural Components With Fasteners".

FIELD OF THE INVENTION

The present invention generally relates to attaching structural elements with fasteners, and more particularly to a novel method and apparatus for fastening structural elements together with fasteners.

BACKGROUND OF THE INVENTION

It is well known to use screws and nails, or similar pin-type fasteners, for securing floor, wall and ceiling panels to supporting structures in buildings and vehicle cargo container bodies. In the case of truck trailer bodies, hard wood floors are attached to a metal frame or substrate. The typical truck trailer body has a steel frame, and the hardwood flooring is secured to the steel frame with metal fasteners. One common technology for securing floors to truck trailer bodies requires pre-drilling holes in both the wood flooring and the underlying metal frame, e.g., steel angle irons and/or I-beams, and applying self-tapping screws through those holes to anchor the flooring to the frame. In some cases, vehicle cargo bodies or personnel-containing structures, e.g., mobile homes, may use aluminum framing. Since aluminum frame members are more easily penetrated than steel frame members of the same thickness, wood flooring and wall and ceiling panels may be attached to aluminum framing by means of nail-type pins with spiral grooves disposed along a portion of their length, with those pins being driven through the flooring and into aluminum frame members by means of a pneumatic high impact driver, e.g., a driver as disclosed in my U.S. Pat. No. 5,645,208, issued 8 Jul. 1997 and U.S. Pat. No. 4,040,554, issued 9 Aug. 1977.

However, applying such pins with a pneumatic high impact driver has limitations with respect to attaching hard wood flooring to steel framing. For one thing, the high impact produced by such a driver tends to split the hardwood flooring. Also, some steel framing members are not readily penetrated by the pins under the force exerted by the high impact driver, particularly when the steel frame members have a thickness of ⅛ inch or greater. Moreover, since it is strictly an impact driving procedure, when a fastener is driven through the flooring member into an underlying steel frame member, the fastener may not be driven in far enough to force the flooring member into a tight fit with the frame, resulting in it not passing inspection requirements. Consequently the procedure using predrilled holes and self-tapping screws has become standard industry practice, even though it is slow due to the need to pre-drill the members to be secured together. Nevertheless, in an attempt to avoid the necessity of pre-drilling the underlying frame members, driver/fastening systems have been conceived whereby special high carbon steel self-drilling wing screws are applied using a high speed screw-driving tool.

One such system is made by Muro Corporation of Tokyo, Japan and comprises its model FLVL41 pneumatic power screwdriver and its Super Wing screws. Those products can be viewed at the web-site "muro.com". The self-drilling wing screws comprise a forward drill portion, a rearward screw portion, and usually a pair of laterally-projecting wings between the drill and screw portions that serve to form oversize holes in the wood flooring, thereby assuring that the panels will not lift away from the underlying steel frame as a reaction to the rapidly rotating screw portion. The wings break off when they encounter the underlying metal frame members. Such systems are suitable for penetrating mild steel frame members in thicknesses up to about 3/16 inch. However, an impedance to exclusive use of such high speed screw-driving systems using self-drilling wing screws is that trailer body manufacturers are now preferring to use a high tensile strength steel having a tensile strength of 80,000 psi and a yield strength of approximately 50,000-65,000 psi. It is difficult to reliably penetrate that kind of steel in a thickness of ⅛" using the self-drilling wing screws and a high speed screw-driver. A particular problem is that the fast rotating screws tend to burn due to the heat buildup. Similarly, slow rotating screws do not develop enough torque to penetrate the steel substrate. Therefore, there exists a need for an improved fastening method and apparatus which can reliably attach wood flooring to high tensile strength steel substrates having a thickness in the order of ⅛" or greater.

OBJECTS AND SUMMARY OF THE INVENTION

The primary object of this invention is to overcome the limitations of the prior art with respect to attaching hardwood flooring to steel substrates, notably in the attachment of flooring to trailer truck bodies, large shipping containers and similar structures.

A more specific object of the invention is to provide a method of attaching fasteners that combines the driving force of a pneumatic rotary impact driver with the economies of self-drilling screws.

A more specific object of the invention is to provide a method of applying fasteners wherein (a) drilling penetration and (b) self-tapping screw attachment of the fasteners are achieved by sequential application of a rotational driving force and a rotational impact driving force.

Another object of the invention is to provide an apparatus for attaching wood structural members to metal substrates wherein the apparatus comprises drive means for rotatively driving self-drilling, self-tapping fasteners through the wood structural members and also rotatively impacting the fasteners to facilitate penetration of and attachment to the metal substrates.

Still another object is to provide an apparatus for attaching wood flooring to steel substrates using self-drilling screw fasteners that is characterized by means designed to reduce user fatigue in operating the apparatus.

A further object is to provide a means for attaching wood flooring to steel substrates using self-drilling screw fasteners that do not cause the flooring to lift up as the fasteners are driven through the flooring into the steel substrates and do not require any pre-drilling of holes in the flooring or the steel substrate.

Another object is to provide an apparatus comprising a rotary impact driver for driving fasteners into locking relation with two structural members and a magazine that accommodates a clip of fasteners in the form of a plastic strip comprising a series of sleeves and a fastener supported by each sleeve, with the magazine operating to advance the clip so that each fastener in turn is positioned to be driven by the driver.

These and other objects are achieved by providing a tool that comprises means for supporting a self-drilling, self-tapping screw fastener in position to be driven, drive means for rotatively driving the fastener through a first relatively soft structural element until it encounters a second relatively hard structural element made of metal that presents a predetermined level of resistance to penetration of the fastener, and then simultaneously rotatively impacting the fastener to overcome the resistance to penetration, whereby the fastener penetrates the second structural element by drilling a hole and tapping it to form a screw connection holding the first structural element to the second structural element. A magazine feeds fasteners into position to be driven. The drive means preferably comprises a powered torque and impact transmitting unit that supports and drives a tool bit that is adapted to make a locking engagement with the head of a fastener, a fastener positioning member for positioning fasteners received from the magazine, and telescoping means connecting the fastener positioning member and the torque and impact transmitting unit for bringing the tool bit into engagement with a fastener positioned by said fastener positioning member whereby said tool bit can cause that fastener to make a screw connection with the structural elements. Other features and advantages of the invention are described or rendered obvious by the following detailed specification.

THE DRAWINGS

FIG. 8 is a rear view in elevation of the face plate that serves as a guide for fasteners and their supporting strip;

FIG. 9 is a sectional view taken along line 9-9 of FIG. 8;

FIG. 10 is a front view of the same face plate;

FIG. 11 is a plan view, with a portion shown in section, of the same face plate;

FIG. 18 is a side view in elevation of a preferred embodiment of the invention;

FIG. 25 is an enlargement of one form of fastener used with a tool embodying the present invention.

DETAILED DESCRIPTION OF THE INVENTION

Figure 1:
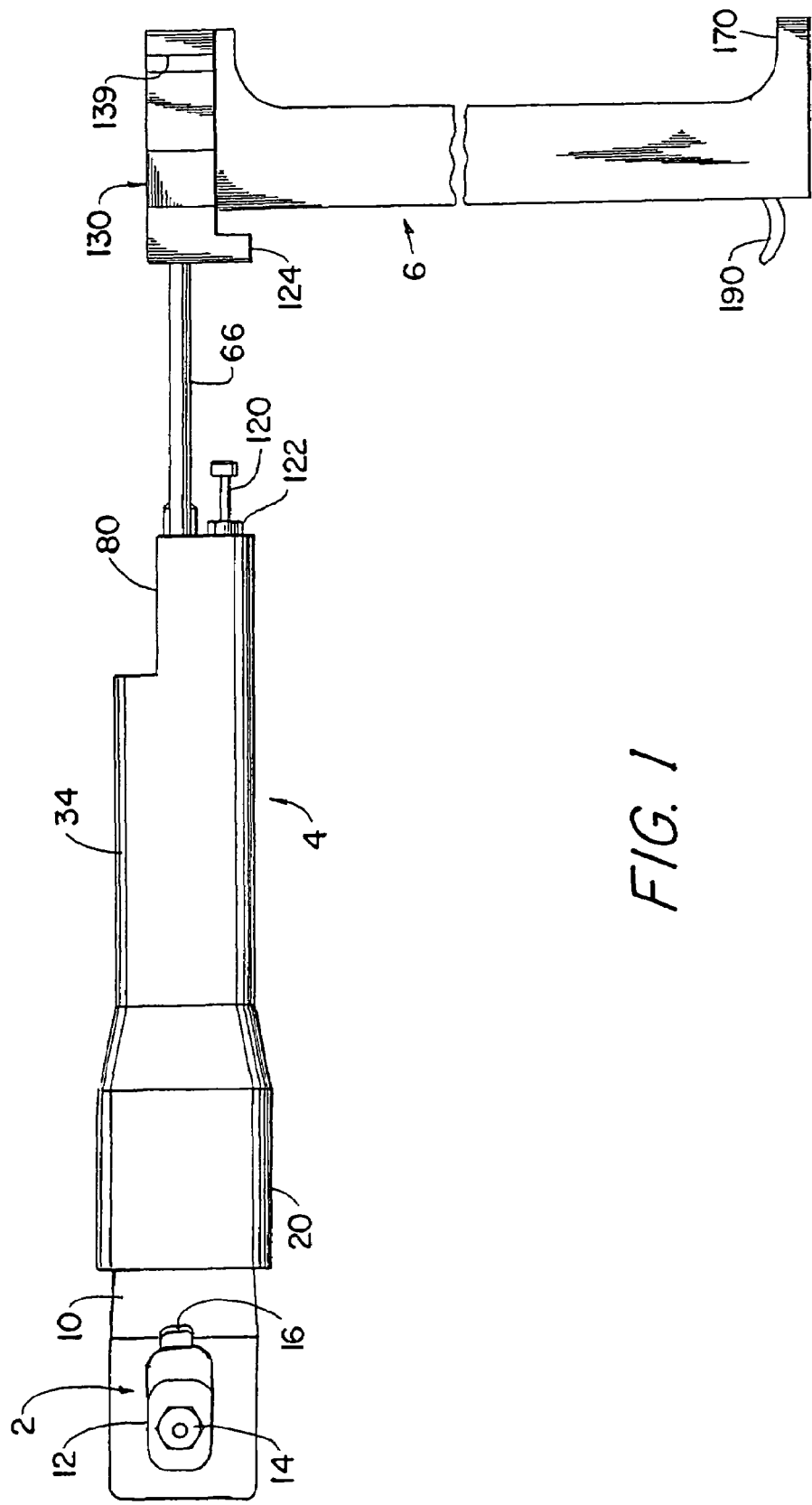
FIG. 1 is a side view in elevation of one embodiment of the invention.
Figure 2:
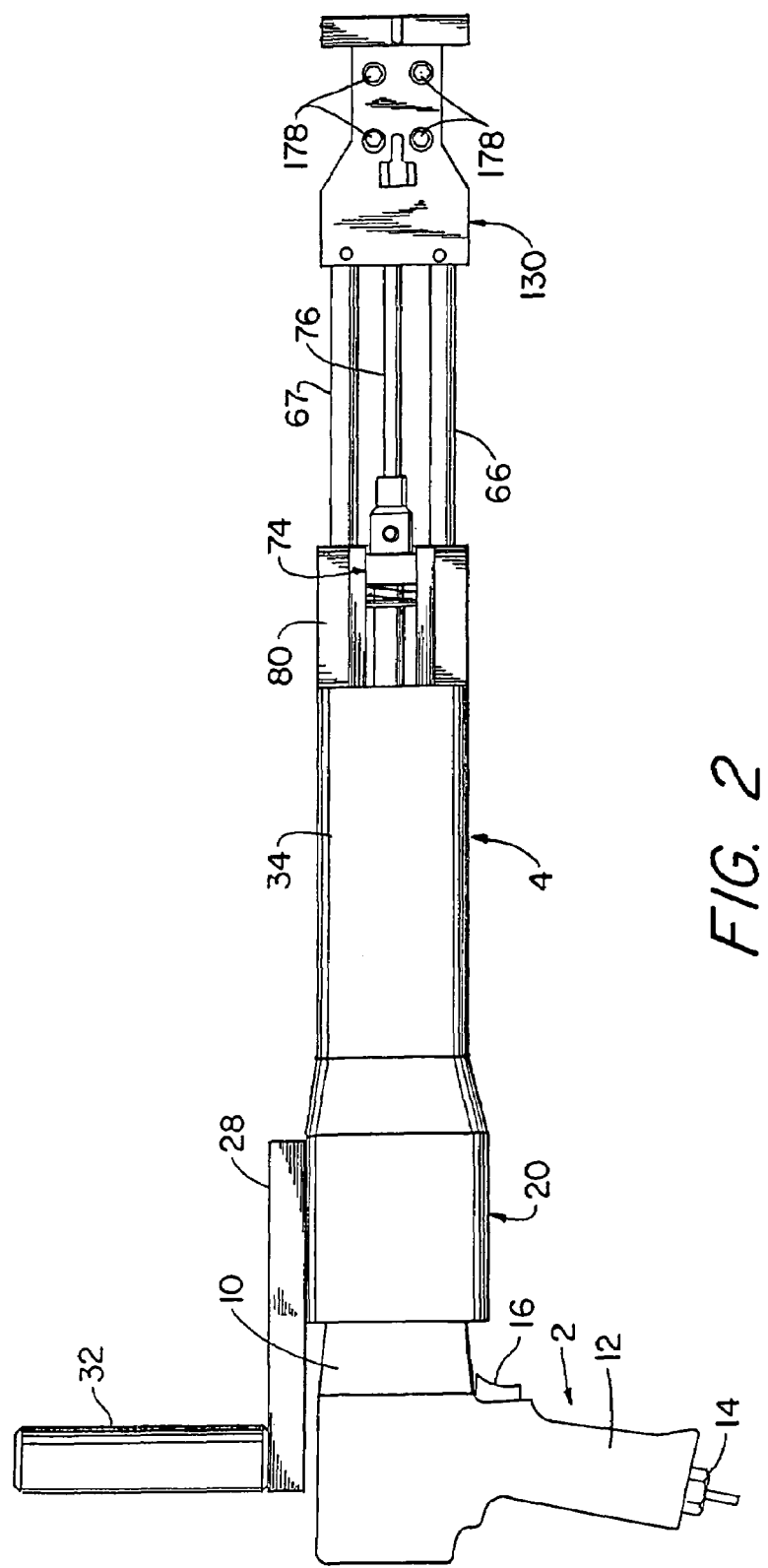
FIG. 2 is a front view in elevation of the same tool.

Referring to FIGS. 1 and 2, the illustrated apparatus includes and utilizes a conventional pneumatically-powered rotary impact driver 2 that preferably, but not necessarily, is adapted to operate in both forward and reverse directions. Such tools, commonly known as rotary impact wrenches, are made and sold by numerous companies and their construction is exemplified by the devices shown in the following U.S. Pat. Nos.: 2,463,656, issued 8 Mar. 1949 to F. H. Thomas; U.S. Pat. No. 3,428,137, issued 18 Feb. 1969 to R. J. Schaedler et al; U.S. Pat. No. 4,347,902, issued 7 Sep. 1982 to W. K. Wallace; U.S. Pat. No. 4,951,756, issued 28 Aug. 1990 to R. J. Everett et al; U.S. Pat. No. 5,083,619, issued 28 Jan. 1992 to D. A. Giardino; U.S. Pat. No. 5,320,187, issued 14 Jun. 1994 to J. Pressley; U.S. Pat. No. 5,622,230, issued 22 Apr. 1997 to D. A. Giardino; and U.S. Pat. No. 5,906,244, issued 25 May 1999 to S. C. Thompson. However, for the purposes of this invention, the tool must be of the type that has two operating modes, a rotary driving mode and an impact rotary driving mode, with the tool automatically shifting to its impact rotary driving mode when the resistance to rotation of the fastener being driven by the tool attains a predetermined value. One such commercial impact driver that is usable to practice the present invention is the Model IR 2131 made by Ingersoll-Rand Co. of 200 Chestnut Ridge Road, Woodcliff Lake, N.J. 07675.

Figure 3:
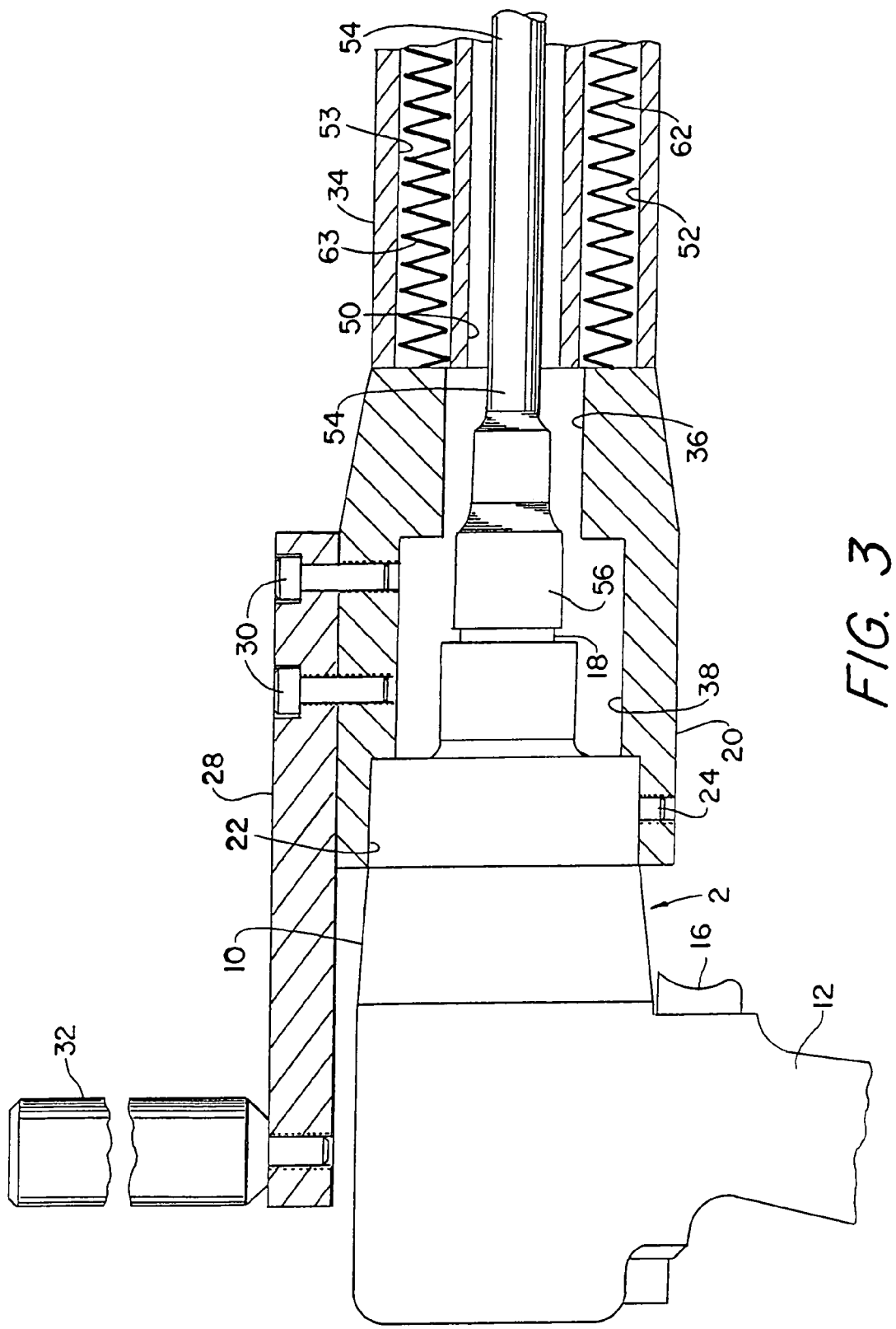
FIG. 3 is a fragmentary longitudinal center sectional view of the same tool.

Still referring to FIGS. 1 and 2, the driver 2 is attached to a torque and impact transmitting unit 4 to which is attached a magazine 6 that carries a supply of fasteners 8 (FIG. 6), as hereinafter described. Driver 2 has a housing 10 and a handle 12 that is provided with a hose connector 14 for attaching the driver to a source of high pressure air (not shown) via a flexible hose line (also not shown). The tool has a trigger 16 that controls its operation. When the trigger is depressed, high pressure air is delivered to the operating mechanism of the impact driver. Referring to FIG. 3, the tool has an output shaft or spindle 18 which is driven by the operating mechanism when trigger 16 is squeezed to allow high pressure air to enter the tool.

The torque and impact transmitting unit 4 comprises a hollow housing 20 (FIG. 3) having a counterbore 22 in one end in which driver housing 10 is received. The driver is secured to the housing 20 by means of one or more set screws 24, or other suitable fastening means. Use of set screws facilitates removal of the torque driver for repair and replacement. An elongate bar 28 has one end secured by screws 30 to housing 20 in diametrically aligned relation with driver handle 12, and attached to the other end of bar 28 is an auxiliary handle 32 that permits two-handed gripping of the apparatus when it is used to drive fasteners.

Figure 4:
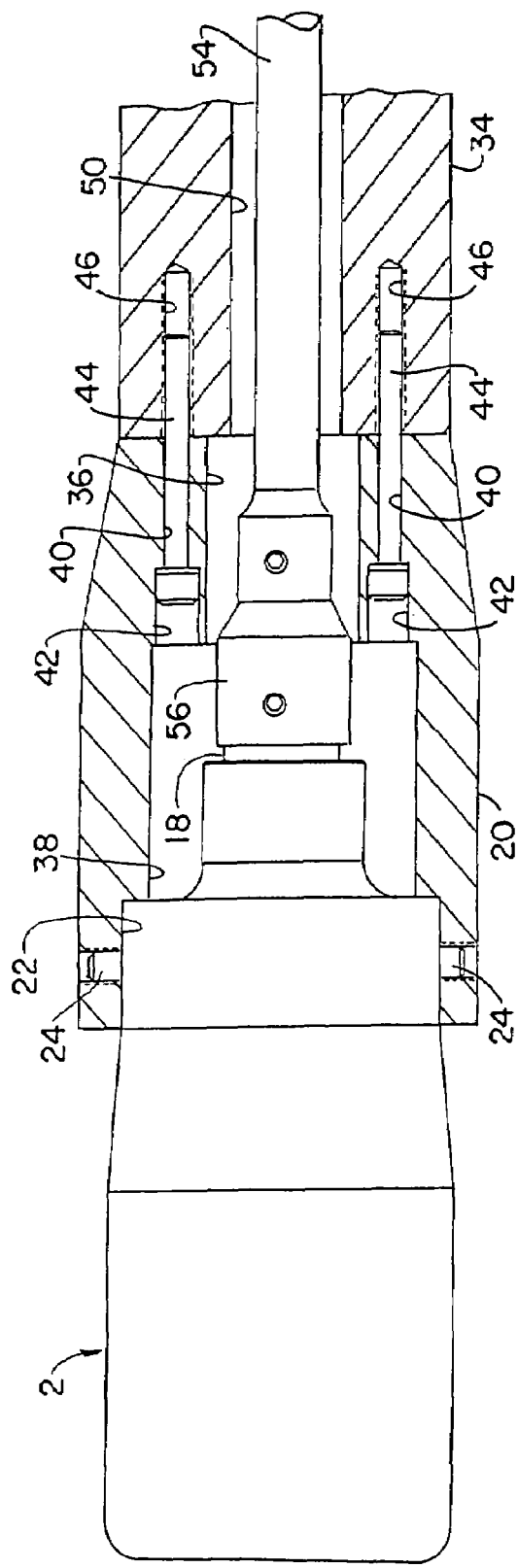
FIG. 4 is a fragmentary longitudinal center sectional view taken at a right angle to FIG. 3.

A hollow barrel 34 is attached to the forward end of housing 20. In this connection, housing 20 has a center bore 36 (FIG. 3), and a counterbore 38 between bore 36 and counterbore 22. As shown in FIG. 4, two holes 40 having counterbores 42 are provided on opposite sides of center bore 36. Barrel 34 is secured to housing 4 by machine bolts 44 that are received in holes 40 and counterbores 42 and are screwed into tapped holes 46 in the rear end of barrel 34.

Referring now to FIGS. 3-6, barrel 34 has a central bore 50 and two additional bores 52 and 53 in diametric alignment with bore 50. Bore 50 accommodates a drive shaft 54 that is attached to the spindle 18 via a coupling 56. The latter make take various forms, and preferably it is of a type that readily permits the operator to disconnect it from spindle 18. The forward (outer) end of bore 50 is slightly enlarged in diameter so as to form a shoulder that acts as a stop for the outer race of a ball bearing unit 58. The outer race of the ball bearing unit is held in place against that stop by a retainer ring 60 received in a groove in the surrounding cylindrical surface that defines bore 50. The inner race of bearing unit 58 is engaged by a shoulder or drive shaft. The ball bearing functions to provide radial support for drive shaft 54 while facilitating its rotation under the influence of driver 2.

Bores 52 and 53 contain compression springs 62 and 63. Also mounted within the bores 52 and 53 are two slide rods 66 and 67 respectively. Outer end portions 52A and 53A of bores 52 and 53 have a slightly reduced diameter so as to form shoulders 68 (FIG. 5) that act as stops for enlarged heads or flanges 70 formed on the inner ends of the slide rods. Heads 70 are sized to make a close fit in the bores 52 and 53. The springs 62 and 63 have one end engaged with the forward end face of housing 20 and the opposite end engaged with the heads 70 of the two slide rods. The springs constantly urge rods 66 and 67 to telescope forwardly, i.e., outwardly of barrel 34.

Figure 5:
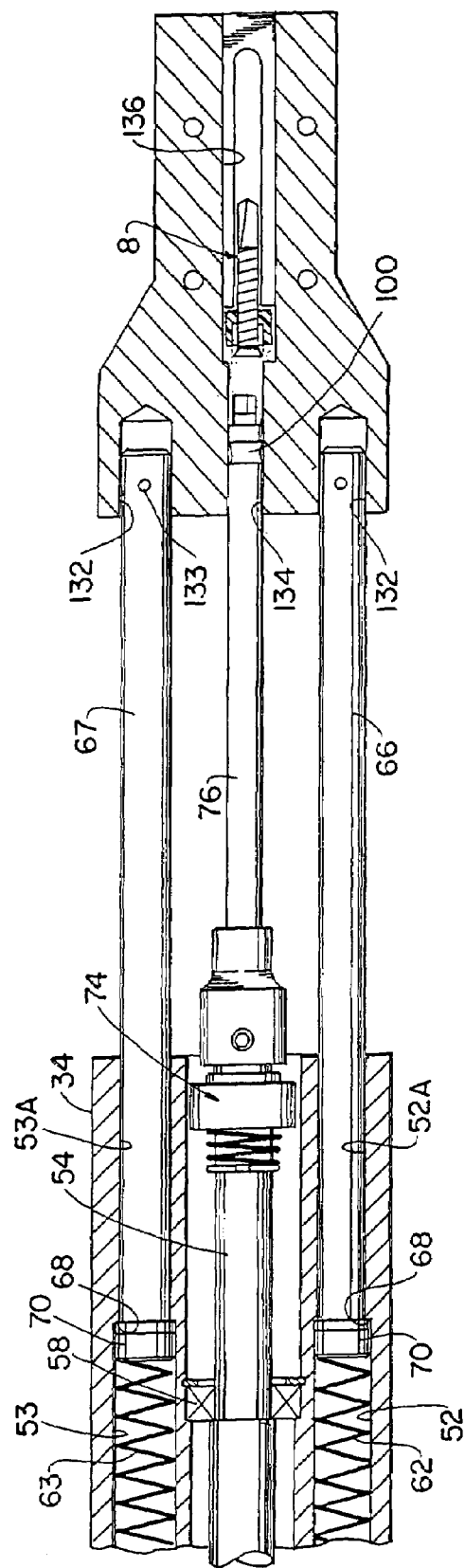
FIG. 5 is a fragmentary longitudinal center sectional view that forms an extension of FIG. 4.
Figure 6:
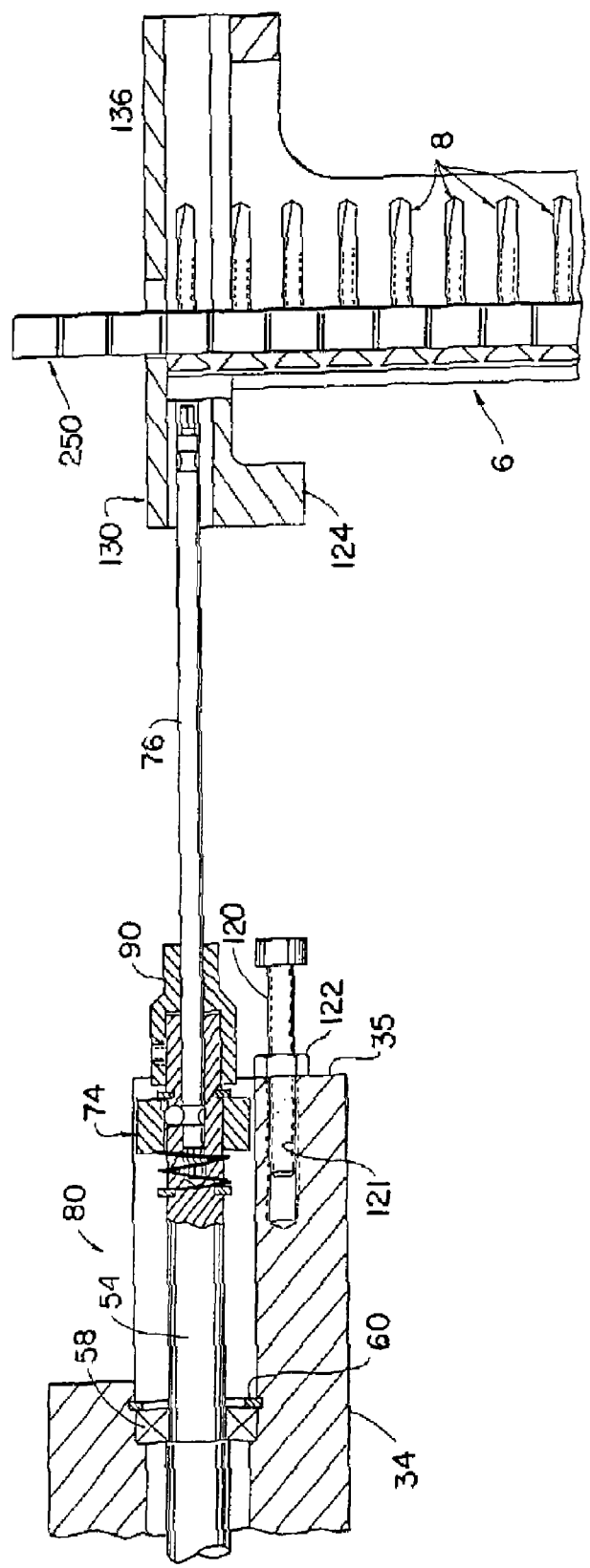
FIG. 6 is a fragmentary longitudinal center sectional view that forms an extension of FIG. 3.
Figure 7:
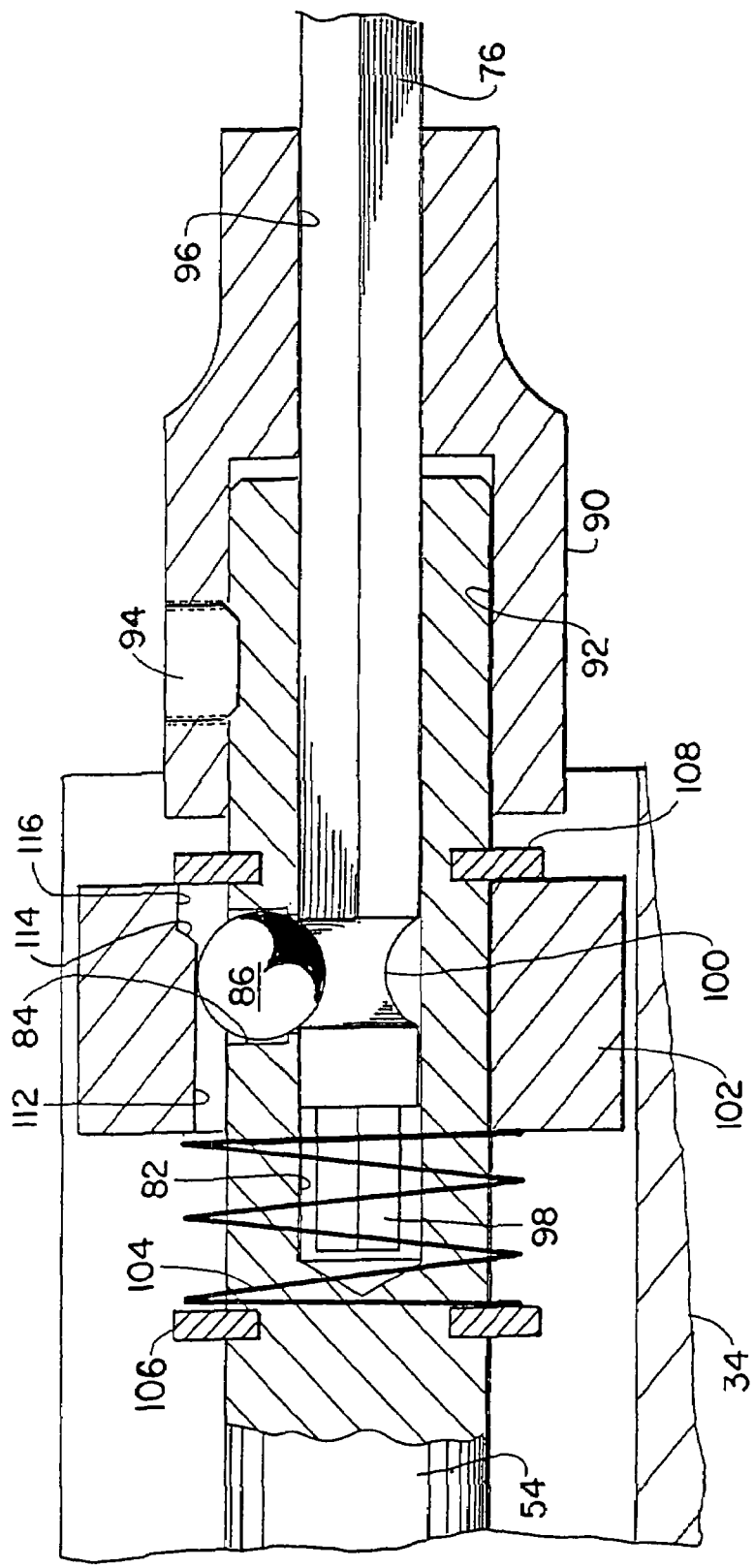
FIG. 7 is an enlargement of a portion of FIGS. 6.

Referring now to FIGS. 5-7, the forward end of drive shaft 54 is provided with connector means, identified generally by numeral 74 in FIG. 5, for attaching a tool bit 76. The connector means may take various forms, but preferably it is of the quick disconnect type. The outer end of barrel 34 is cut away through an angle of about 140° so as to form an open section 80 that permits access to connector means 74.

As shown in FIG. 7, the forward end of drive shaft 54 is provided with a blind hole in the form of a short coaxial bore 82 of circular cross-section, and also with a radially extending round hole 84 that intersects axial bore 82. A spherical ball 86 resides in hole 84, and the inner end of hole 84 has a reduced diameter so as to prevent ball 86 from fully entering bore 82. The outer surface of the forward end of shaft 54 has a circular configuration, and a socket member 90 having a relatively large circular hole 92 surrounds the forward end of shaft 54 and is locked thereto by a set screw 94 that is received in a blind hole in shaft 54. The opposite end of socket member 90 has a square opening 96 that is sized to receive tool bit 76, the latter also having a square cross-sectional shape sized to make a close fit in opening 96, whereby the tool bit is locked against rotation relative to the socket member.

Preferably tool bit 76 is made so that it is reversible, with each of its opposite ends being adapted for driving engagement with a fastener having a square socket hole in it head. More specifically, each end of tool bit 76 is formed with a fastener-engaging end section 98 that is shaped to fit into and mate with a recess in the head of fastener 8, as hereinafter described. By way of example, the two ends of the tool bit may have a square or cross-sectional shape. Additionally adjacent each of its opposite ends tool bit 76 has a peripheral circular groove 100 that is coaxial with the tool bit. Grooves 100 have a circular curvature in cross-section, with the radius of curvature being sized so as to permit a close fit with ball 86.

Still referring to FIG. 7, connector means 74 comprises a lock ring 102 that surrounds the forward end of drive shaft 54. Lock ring 102 is urged away from bearing 58 by a compression spring 104 that is held against the lock ring by a retaining ring 106 seated in a peripheral groove in shaft 54. A second retaining ring 108 is seated in a second peripheral groove in shaft 54 in position to limit forward movement of ring 102, i.e., movement away from retaining ring 106. Lock ring 102 is sized to make a close sliding fit on shaft 54. However, its inner surface is provided with a longitudinally-extending slot that is stepped so as to have a first surface section 112 that lies closest shaft 54, a second surface section 116 that lies furthest from shaft 54, and a sloping transition surface section 114. Surface sections 112, 114 and 116 may be flat, but preferably they have a circular curvature in horizontal cross-section taken from the perspective of FIG. 7. If those surfaces are curved, their radius of curvature is the same as, or slightly greater than, the radius of ball 86. The width of the slot is limited so that its engagement with ball 86 prevents rotation of lock ring 102 relative to drive shaft 54.

The tool bit 76 extends into the blind bore 82 of shaft 54 far enough for its groove 100 to be engaged by ball 86. When lock ring 102 is forced back toward retaining ring 106 far enough to align its surface section 116 with ball 86, enough clearance is provided to permit ball 86 to be cammed outwardly clear of the tool bit when a pulling force is applied to the tool bit to separate it from the drive shaft. When it is desired to insert the tool bit in shaft 54, the lock ring 102 is forced manually backward away from retaining ring 108 far enough to align surface section 116 with ball 86, thereby allowing the ball to be forced out of the way by the inwardly moving tool bit. When the groove 100 is again realigned with ball 86, lock ring 102 is released, whereupon spring 104 returns it to the ball locking position shown in FIG. 7, with the sloping transition surface section 114 acting to cam the ball into groove 100. When ball 86 is in groove 100 and engaged by surface section 112, the ball serves to lock the tool bit against removal from drive shaft 54. It should be noted that ball 86 does not bear or transmit any of the torque load when the tool bit is rotated by drive shaft 54 since the torque transmission is performed by socket member 90, which is locked to shaft 54 by set screw 94 and is locked to the tool bit by virtue of having a square hole 96 that mates with the square cross section of the tool bit shaft. As is believed obvious, the connector means just described and illustrated is a quick disconnect locking device.

In addition to the foregoing, force-transmitting unit 4 also carries a screw bolt 120 which is received in a threaded opening 121 in the forward end of barrel 34. A lock nut 122 is screwed onto bolt 120 in position to engage the end face 35 of barrel 34, whereby to lock bolt 120 in a selected position. The head of bolt 120 functions as a stroke limiter acting in conjunction with a stop member 124 carried by a face or positioning plate 130 described below. Bolt 120 is extended or retracted as required to assure that the fasteners 8 are fully seated in the wood/steel substrate.

Referring now to FIGS. 5, 6 and 8-11, the outer ends of slide rods 66 and 67 are secured in blind holes 132 in face plate 130, preferably by lock pins 133. Face plate 130 has a round bore 134 that extends parallel to holes 128 and is sized to receive tool bit 76 in a close fit. Bore 134 extends for only part of the length (the vertical dimension as seen in FIGS. 6 and 9) of the face plate, the inner end of bore 134 merging with an enlarged opening 136 that extends through the outer (bottom) end surface 138 of the face plate and serves as an exit passageway through which fasteners are driven into a workpiece, e.g., a wood flooring panel overlying a metal substrate in the form of an I-beam or a U-shaped channel member. Face plate is formed with two laterally projecting foot rests 139 that are used to facilitate use of the illustrated apparatus.

Face plate 130 has a rear surface 140 and a front surface 142. Rear surface 140 is formed with an opening 144 that is of equal width throughout its length except for a wider section 146 near its top end. The minimum width of opening 144 is large enough to accommodate fasteners 8 (FIGS. 6, 12 and 14) described hereinafter and the width of its wider section 146 is made slightly larger, preferably about 0.015 inch greater, than the width of the plastic strip 250 (FIGS. 6, 12 and 14) that supports fasteners 8. Front surface 142 is formed with a T-shaped opening 148 that has a wider upper section 150 with a width that is slightly greater than the width (lateral dimension) of the plastic fastener-supporting strip 250. Opening 148 is aligned with opening 144 and its upper section 150 is aligned vertically and horizontally with the wide section 146 of opening 144, whereby its upper section 150 can serve as an exit path for successive fastener-retaining sleeve sections of plastic strip 250. Preferably all of the edge surfaces of openings 144 and the sides of the upper section 150 of opening 148 are chamfered (beveled) as indicated at 160 and 162.

Figure 12:
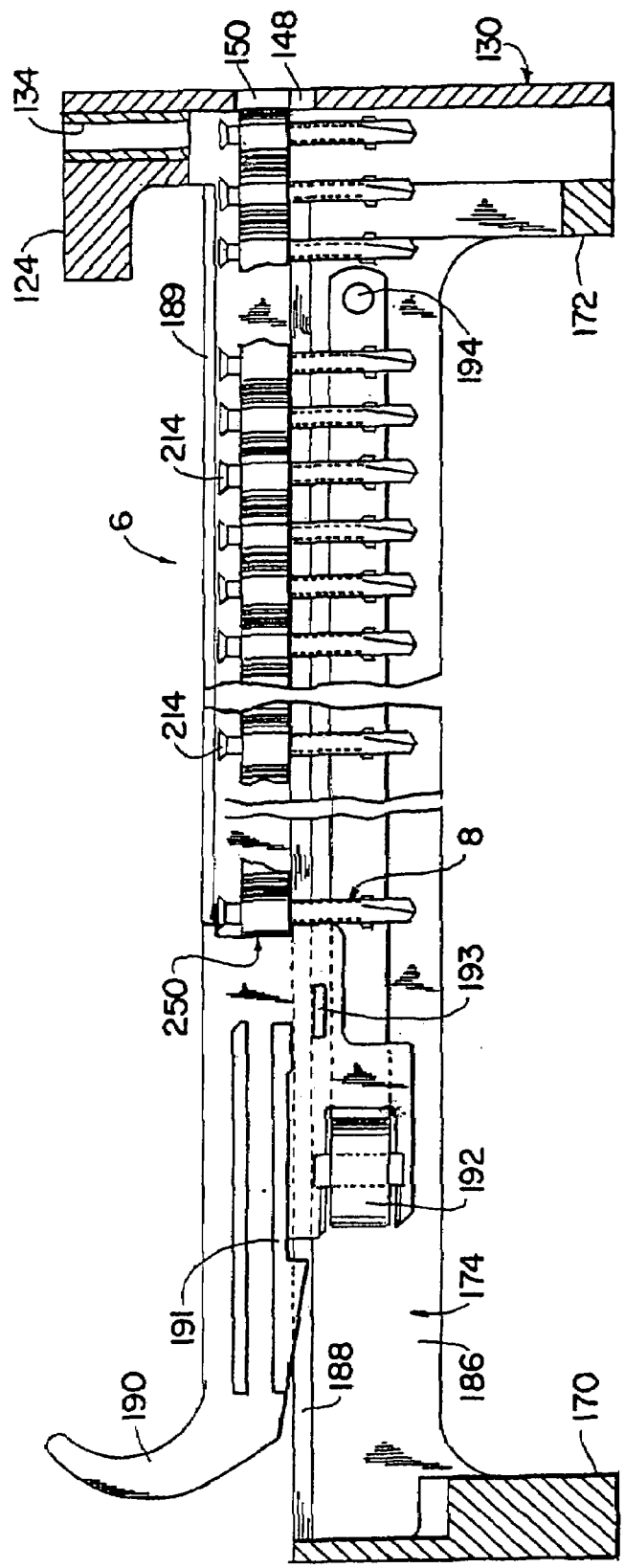
FIG. 12 is a longitudinal center line section in side elevation of the fastener clip magazine.
Figure 13:
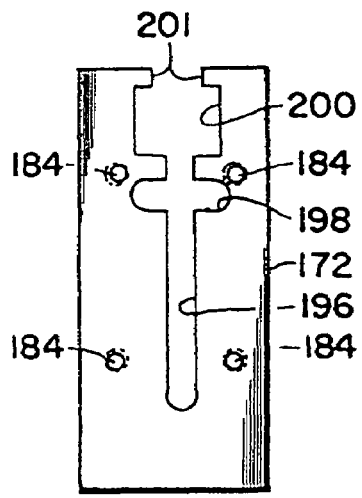
FIG. 13 is a front end view in elevation of the fastener clip magazine.

Referring to FIGS. 6, 12 and 13, the magazine 6 comprises opposite end plates 170 and 172 and two parallel and mutually spaced side plates 174 (only one of which is shown) that are joined to and extend between the two end plates. The magazine is attached to face plate 130 by four bolts 178 (FIG. 2) that pass through aligned holes 182 and 184 in face plate 130 and end plate 172 respectively (FIGS. 8, 13). The spacing between the mutually confronting inner surfaces 186 of side plates 174 is slightly greater than the width of strip 250. The inner surfaces 186 are provided with longitudinally extending ribs 188 that serve as supporting rails for fastener-supporting strip 250.

A pusher member 190 disposed between side plates 174 engages the rear end of strip 250 and pushes it (with its associated fasteners 8) toward end plate 172. Each side of pusher member 190 has a long rib 191 and a short rib 193 that overlap the upper and lower sides of the adjacent rail 188, thereby slidably interlocking the pusher member to side plates 174 so that the pusher is restricted to straight line movement toward and away from end plate 172. The pusher member is urged toward end plate 172 by a constant force coil spring 192 which is rotatably mounted to the pusher member and has its free end attached by a stud 194 to one of the side plates 174 adjacent to end plate 172.

End plate 172 has a through slot 196 that has its width and height sized to allow passage therethrough of the shanks 212 of fasteners 8. The upper end of slot 196 has two enlarged sections 198 and 200. Section 198 serves to provide clearance for the short ribs 193 of pusher member 190. Section 200 is rectangular and has its width and height sized to allow passage therethrough of strip 250 and the heads of fasteners 8. The inwardly extending ribs 201 defining the upper side of section 200 act to limit vertical movement of the nail supporting strip 250 while providing clearance for the upper portion of pusher member 190. Slot 196 is aligned with opening 144 so that strip 250 and the associated fasteners 8 can pass cleanly through slot 196 and opening 144 into opening 136.

In this connection, it should be noted that when a strip 250 carrying fasteners 8 is supported on rails 188, the heads 214 of the fasteners will be above the level of the upper edge 151 of the upper section 150 of opening 148; however, the strip 250 will be aligned with the upper opening section 150 so that the upper side strip 250 is slightly below the upper edge 151 of upper opening section 150. Consequently, (a) when the strip 250 is urged toward face plate 130 by pusher member 190, it will be stopped as a result of surface 200 (FIG. 9) of face plate 130 intercepting the head of the lead (first) fastener carried by the plastic strip, and (b) after the lead fastener is driven out of the plastic strip by the tool bit in the manner hereinafter described and the tool bit withdrawn from opening 134 of face plate 130, the leading (now empty) fastener-retaining section of the plastic strip will be forced through the opening 150 until the head of the next-in-line fastener is intercepted by surface 200.

Referring to FIGS. 6, 12 and 25, the illustrated fasteners 8 each includes comprises a head 214, a pointed tip 216 and a shaft that comprises a forward self-drilling section that consists of two helical cutting flutes 218 and a rearward self-tapping section that is characterized by a screw thread 222 that commences at the rearward end of cutting flutes 218 and preferably extends to where the head 214 joins the shaft. However, it is contemplated that screw thread may terminate short of the fastener head. Preferably screw thread 222 has a triangular shape in cross-section, so that the thread has a sharp cutting edge. The maximum diameter of the self-tapping screw section exceeds the maximum diameter of the forward self-drilling section comprising flutes 218, whereby to allow the self-tapping section of the fastener to cut a mating screw thread in the hole formed in a metal substrate by the drilling flutes of the fastener's forward self-drilling section. A preferred screw design comprises a thread with a pitch angle in the range of about 57° to about 63° and a flat root, and the tip 216 has an apex angle Ø in the range of about 110° to about 120° so as to facilitate piercing steel or other metal as hereinafter described. Each fastener also is formed with two diametrically opposed blade-like wings 224 at the trailing end of the two cutting flutes. The bottom edge of each wing, i.e., the end edge closest to the tip 216, is tapered so as to provide a cutting edge that enables the wings to cut into a wood flooring member and form a hole therein that is slightly larger than the o.d. of the threaded section 212 of the fastener.

Figure 16:
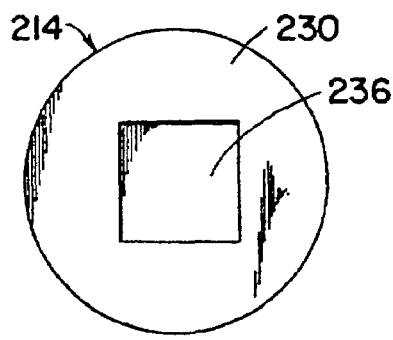
FIG. 16 is a plan view of the head of a fastener.
Figure 17:
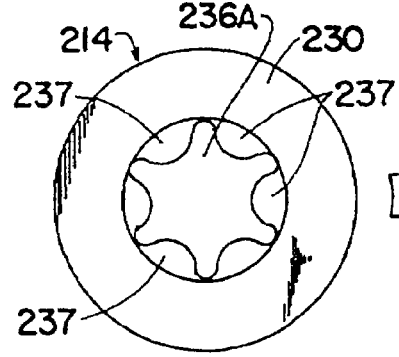
FIG. 17 is a plan view of the head of an alternative fastener.
Figure 15:
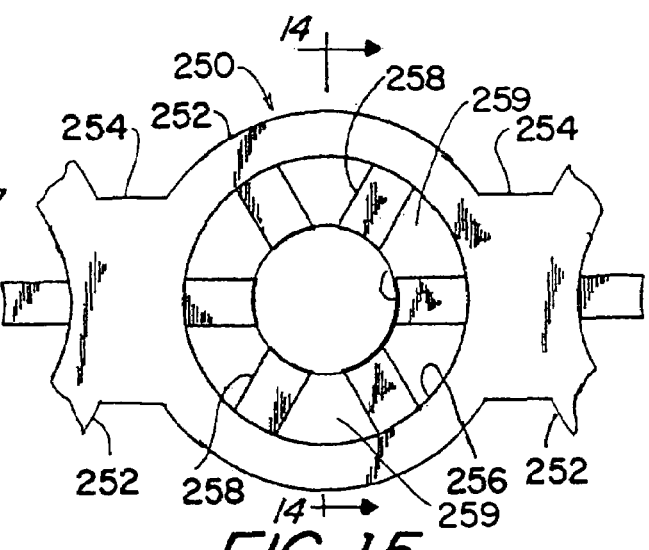
FIG. 15 is a bottom view of a portion of the fastener-holding strip.
Figure 19:
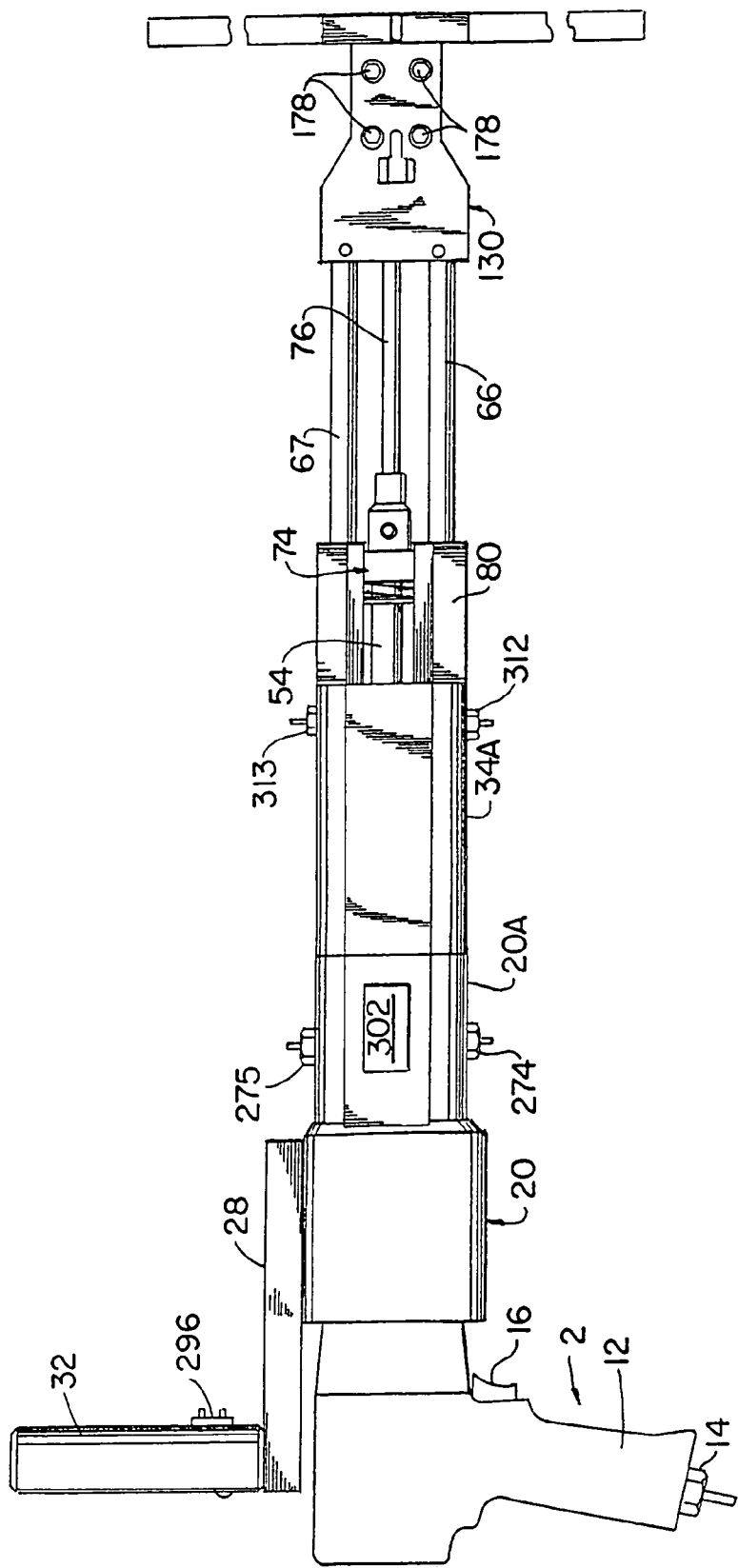
FIG. 19 is a front view in elevation of the apparatus shown in FIG. 18.

The head 214 is formed with a flat top surface 230 and a tapered side surface 234. Top surface 230 is formed with a suitable recess for interlocking with a driver tool bit. As illustrated in FIG. 16, the upper surface 230 preferably is provided with a square recess 236 for receiving the square end of tool bit 76. Of course, the recess in surface 30 may have a different shape to accommodate a tool bit with a different end configuration. Thus, as shown in FIG. 17, for example, the fastener head may have a multi-lobe recess 236A, with the lobes 237 being beveled so as to slope inwardly and downwardly from the surrounding portions of top surface 230 to facilitate insertion of a Torx®-style tool bit of like multi-lobe shape. Additionally, the tapered side surface 234 is formed with a plurality of cutting ribs 240 (a total of eight ribs is preferred but not essential) which are spaced uniformly from one another about the circumference of tapered surface 234. Preferably ribs 240 have a square or rectangular cross-sectional shape, with the outwardly extending opposite sides 242A and 242B of each rib extending on opposite sides of and parallel to an imaginary diametrically-extending plane, i.e., a plane that includes the center axis of the fastener and is equally spaced from 242A and 242B. The forward edges of flat sides 242A and 242B, i.e., more specifically, the corners formed by those sides with the outer side of the rib, function as cutting blade edges depending on the direction of rotation of the fastener. Alternatively the ribs could be formed with a triangular cross-sectional shape, with each rib having a first side that extends outwardly like side 242A or 242B and a second side that forms the hypotenuse of the triangle and extends from surface 234 to the outer edge of its first side. The corner formed by the intersection of the outer end of the first side with the second hypotenuse side serves as a cutting blade edge.

Referring to FIGS. 6, 12, 14 and 15, the fasteners 8 are mounted in a plastic mounting strip 250 having a series of uniformly spaced circular through holes 256 for accommodating the fasteners. Preferably, but not necessarily, the strip is molded of polyethylene, polypropylene or nylon and is of moderate density and flexibility. Strip 250 may have flat longitudinally-extending opposite side surfaces, but preferably those surfaces are contoured with circularly curved segments 252 so that the strip has a series of reduced width portions 254. The contoured side surfaces offer the advantage of reducing the amount of surface area of the strip that is contacted by the magazine in which it is supported in fastener-advancing relation to the associated fastener driver. Contouring the side surfaces of the strip so as to provide reduced width portions 254 also reduces the amount of plastic used to make the strip.

Figure 14:
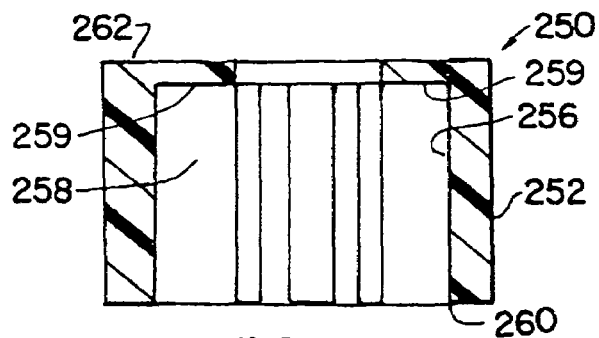
FIG. 14 is a cross-sectional view of a fastener-holding strip.

The holes 256 of strip 250 have a constant diameter, except for the presence of a plurality of radially-extending, uniformly spaced fastener-retaining ribs 258. Preferably, as shown in FIG. 14, the bottom ends of ribs 258 are flush with the bottom edge surfaces 260 of the strip, but the bottom edge surfaces of the ribs may be recessed slightly, e.g., about 1/16 inch, above the level of the bottom surfaces 260 without affecting operation of the invention. At their upper ends the ribs are connected by thin webs 259 that collectively coact with ribs 258 to form a top annular end wall for the hole 256. Ribs 258 and webs 259 have substantially identical radial dimensions, with their inner ends being curved and tangent to a circle having a diameter which is slightly smaller than the maximum diameter of the threaded portion of the fasteners, whereby to tightly grip the fasteners.

As shown in FIGS. 6 and 12, the fasteners are mounted in strip 250 so that their heads 214 are spaced from the upper end surface of the strip. In this connection it is to be noted that the maximum outside diameter of each head 214 is less than the diameter of the holes 256 in which it is mounted, but larger than the diameter of the circle formed by ribs 258 and webs 259. Ribs 258 and webs 259 grip the threaded portion of the fasteners and hold them in strip 250. In this connection it should be noted that the presence of webs 259 is essential to assure that the fasteners are held perpendicular in holes 256.

It has been determined from the use of a plastic strip having ribs 258 but lacking webs 259 that when the fasteners 8 are inserted by machine into the plastic strip 250, the wings 224 tend to cut away by abrasion a small portion of one or more of ribs 258, thereby reducing the grip exerted by the ribs and resulting in the fasteners being somewhat loose rather than being held exactly perpendicular. The existence of play between the fasteners and the plastic strip may interfere with proper driving of the fasteners by the tool bit.

The addition of webs 259 increases the total surface area gripping the fasteners and thereby reduces the amount of "play" between the fasteners and the plastic strip that supports them, even though two of the webs may be torn by the wings 224 when the fasteners are inserted into holes 256. The thickness of webs 259 is kept small to make it easier for the webs to yield rather than tear under the influence of wings 224 when the fasteners are inserted into the sleeves. Making webs 259 thin rather than thick also facilitates expelling of the fasteners from sleeves 252 by operation of the tool provided by this invention.

By way of example, but not limitation, plastic strip 250 may have a width (i.e. the o.d. of sleeves 252) of about 0.650 inch, the holes in the strip (i.e., the i.d. of the sleeves) may have an i.d. of about 0.510 inch, ribs 258 may have a thickness of about 0.075 inch, webs 259 may have a thickness of about 0.010 inch, the circle formed by the inner edges of ribs 258 and webs 259 may have a radius of about 0.225 inch, and the o.d. through the two wings 224 is about 0.020 inch greater than the maximum o.d. of the self tapping threaded sections 222 of fastener 8. Further by way of example but not limitation, strips 250 having the foregoing dimensions have been used to support fasteners of various lengths having a threaded section with an o.d. of about 0.230 inch.

The fasteners 8 and the plastic fastener supporting strip 250 are made in accordance with the invention disclosed in my application Ser. No. 10/618,327, filed on even date herewith for "A Fastener Clip For Use In Supplying Fasteners To a Fastener Driving Tool", now U.S. Pat. No. 7,025,551. To the extent necessary, the disclosure of that copending application is incorporated herein by reference.

As noted above, the cutting flutes of the forward section of the shank of each fastener provide the fastener with a self-drilling capability, while the screw thread that follows the cutting flutes provides the fastener with a self-tapping and screw fastening capability. The wings 224 provide the fasteners with a drilling capability with respect to a wooden flooring panel or board or other member made of wood or other material of like density, while being fragile enough to break off when subjected to a rotational engagement with a hard substrate such as steel. With that combination capability in mind, the above described apparatus makes it possible to utilize those fasteners to secure together two structural components without need for pre-drilling holes in either component.

Figure 26:
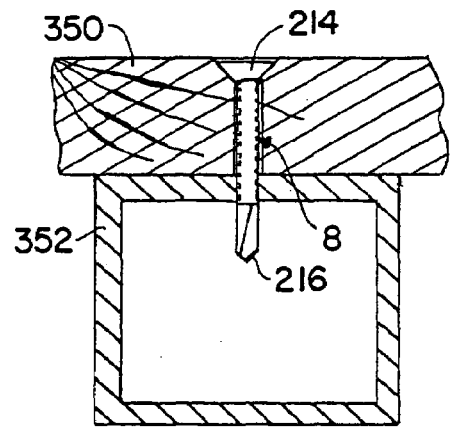
FIG. 26 is a cross-sectional view illustrating a wooden floor member attached to a steel substrate by a fastener that has been applied by a tool made according to the present invention In the drawings, like parts are identified by like numerals.

Operation of the above described apparatus and the method of the present invention are now described in relation to applying fasteners to attach hard wood floor panels to a high tensile strength steel substrate. In this connection, FIG. 26 illustrates a portion of a hard wood flooring member 350 overlying a substrate in the form of a high strength steel beam 352 having a box-like cross-sectional shape, with the two components being secured together by a fastener 8 installed using the driver apparatus of this invention. Assuming that the apparatus is at rest in a vertical position with face plate 130 and magazine 6 resting on the top surface of flooring member 350, springs 52 and 53 act to hold driver 2 and tool bit 76 in an elevated standby position (FIGS. 5 and 6) wherein the tool bit is spaced above the level of the fasteners supplied by magazine 6 to positioning plate 140. With the driver 2 connected to a source of pressurized air, and the magazine 6 loaded with a strip of fasteners 8, the operator places his feet on top of the two foot rests 139 so as to hold the tool down with the weight of his body as it drives a fastener, depresses trigger 16, and pushes down on handles 12 and 32 to compress springs 62 and 63 enough to bring the rotating tool bit into engagement with the head of the leading fastener 8 located in opening 136 of the face plate. The end of the rotating tool bit will enter the recess 236 (in the case of a square end on the tool bit) or the recess 236A (in the case of a multi-lobe end on the tool bit) and then will operate to drive the fastener into the workpiece. As the fastener is being driven by the axially-biased, power-driven rotating tool bit, the cutting flutes 218 and wings 224 will drill through the wood panel and then flutes 218 will drill a hole in the metal substrate. As the cutting flutes 218 penetrate the metal substrate, the relatively weak wings 224 engage that substrate and will be sheared off as a result of the resistance to penetration offered by the hard substrate (the absence of wings 224 in the driven fastener is evidenced by FIG. 26). When the forward portion of the screw thread 222 encounters the hole in the metal substrate formed by the cutting flutes, the leading turn of the screw thread 222 will commence a screw-tapping operation, whereby continued rotation of the fastener under the influence of the downward force exerted by the operator will cause the screw thread 222 to form a mating screw thread in the surrounding metal surface that defines the hole formed by cutting flutes 218, with the formed screw thread in the metal substrate making a screw connection with the fastener, whereby the wood panel is secured to the metal substrate. Engagement of screw bolt 120 with stop member 124 limits the downward travel of the rotating tool bit 76. When the fastener has been driven, the operator stops pressing down on handles 12 and 32, whereupon springs 62 and 63 will cause slide rods 66 and 67 to telescope relative to barrel 35, raising the driver and the tool bit away from the driven fastener.

As noted above, heretofore self-drilling, self-tapping screws could not be driven through hard wood panels into high tensile strength steel using a powered screwdriver without any pre-drilling of holes, and that problem has been overcome by using the pneumatically powered impact torque wrench-type driver 2 to drive the fasteners. According to this invention, during the time that the fastener 8 is drilling through the hard wood panel, the driver 2 is operating as a simple rotating drill/screwdriver. However, when the tool bit tip 76 encounters increased resistance from the appreciably harder steel substrate, the driver automatically shifts to its impact driving mode, and that mode has the effect of causing the fastener to penetrate the metal substrate. If the apparatus of this invention is used to drive fasteners 8 into substrates made of mild steel, the driver may be able cause the fasteners to penetrate the substrates while operating in a simple rotational screwdriver mode, but if not it will automatically shift to its impact driving mode achieve the desired penetration and tapping action. Of course, in the case where the metal substrate is aluminum, the driver 2 will operate in a simple rotational mode to drive the fasteners to the desired depth.

An important aspect of the invention is how the fasteners 8 are separated from the supporting plastic strip 250. The axial and rotational forces exerted on the leading (first-in-line) fastener in the strip by the torque driver device 2 and tool bit 76 will cause cutting ribs 240 to rapidly chew away the retainer ribs 258 and webs 259 of the sleeve 252 that surrounds that fastener. The removed pieces of ribs 258 and webs 259 will pass out of the bottom of the sleeve as the fastener is driven out of the strip through the wood panel into the hard metal substrate. Having the fasteners positioned with their heads elevated above the upper side of the plastic strip is advantageous in that it allows the fasteners to achieve a relatively high rotational speed before their cutting ribs 240 engage the plastic retaining ribs 258 and webs 259, thereby facilitating rapid cutting away of ribs 258 and webs 259. Also as each fastener is driven through a hard wood flooring panel into an underlying metal substrate, the cutting ribs 240 act to cut away portions of the flooring panel and form a countersink shaped to accommodate the head of the driven fastener, thereby permitting the upper surface of the fastener head to be flush with or below the upper surface of the flooring panel, as shown in FIG. 26.

Once the lead fastener has been driven, the operator first releases trigger 16 to driver 2 and then stops pressing down on handles 12 and 32, whereupon springs 62 and 63 push driver 2 upwardly to withdraw the tool bit from face plate 130. Removal of the tool bit from face plate 130 allows the pusher to move the plastic strip forward so as to move the now empty sleeve 252 through opening 150 and position the next-in-line fastener in bore 136. This action avoids the possibility of portions of the plastic strip 250 being captivated between the fastener head and the wood panel.

FIGS. 18-24, illustrate a preferred embodiment of the invention that is like the embodiment shown in FIGS. 1-13 in most respects but differs primarily in that (1) the springs 62 and 63 are replaced by pneumatic means for extending and retracting the slide rods 66 and 67, and (2) a different form of means is used for limiting the extent to which those slide rods are retracted in the course of a fastener-applying operation.

In this alternative embodiment the heads 70 on the inner ends of slide rods 66 and 67 function as pistons and bores 52 and 53 serve as cylinders. Heads 70 are modified to function as pistons by the addition of two O-rings 264 that are seated in peripheral grooves in heads 70 and make a sliding engagement with the surrounding wall that defines cylinder bores 52 and 53. O-rings 264 serve to prevent air from leaking past the piston heads in bores 52 and 53. To further assure against loss of air pressure, additional O-rings 268 (FIG. 20) are located in grooves surrounding the outer ends of bores 52 and 53, with the additional O-rings being sandwiched between barrel 34A and housing 20A, and rod seals 265 held in place by retaining rings 267 prevent air from leaking out of the outer ends of smaller diameter bore sections 52A and 53A In this connection it should be noted that housing 20A is essentially the same as housing 20, except as otherwise described hereinafter.

Housing 20A has two short bores 270 and 271 (FIGS. 20) that are aligned with and form extensions of bores 52 and 53 respectively. Bores 270 and 52 form one pneumatic cylinder and bores 271 and 53 form a second pneumatic cylinder. Bores 270 and 271 are provided with side openings in which are mounted like hose connectors 274 and 275 that are adapted to be connected to flexible air hoses or tubing and function as ports through which pressurized air can move into and out of the two pneumatic cylinders. At the opposite ends of the two cylinders, the bores 52 and 53 also are provided with side openings in which are mounted like hose connectors 312 and 313 that are adapted to be connected to flexible air hoses or tubing and function as ports through which pressurized air can move into and out of the two pneumatic cylinders.

Figure 22:
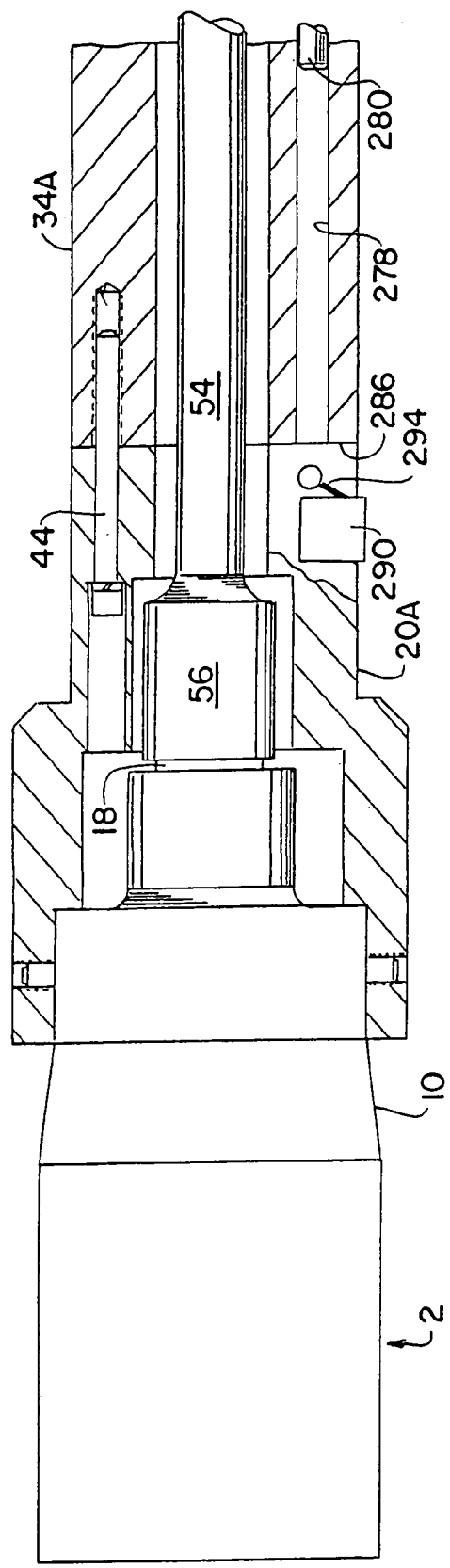
FIG. 22 is a fragmentary sectional view taken at a right angle to FIG. 20.
Figure 23:
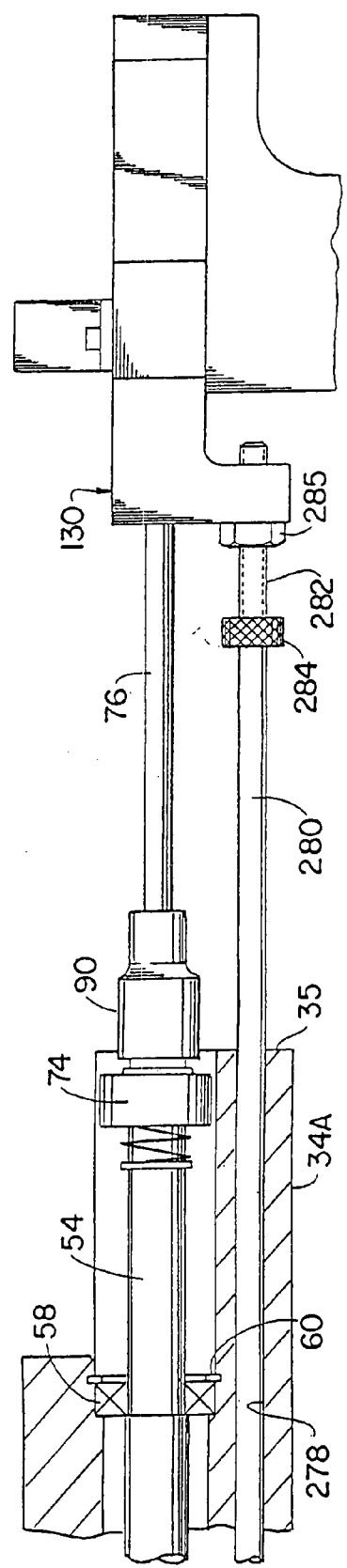
FIG. 23 is a fragmentary sectional view that forms an extension of FIG. 22.

Referring to FIGS. 18, 22 and 23, barrel 34A differs from barrel 34 previously described in that it is provided with a bore 278 that replaces threaded opening 121. Bore 278 extends for the full length of barrel 34A and serves to slidably accommodate a push rod 280. The end of rod 280 that projects out of housing 20A has an external screw thread and is screwed into a hollow screw 282 that is screwed into a threaded hole in the upper end of face plate 130. Screw 282 has a knurled external flange 284 that serves as a gripping section whereby screw 282 can be rotated, whereby to set the effective length of rod 280 relative to bore 278. Flange 284 also serves as a fail-safe stop by intercepting the end surface 35 of band 34A. A check nut 285 is screwed onto push rod 280.

Figure 20:
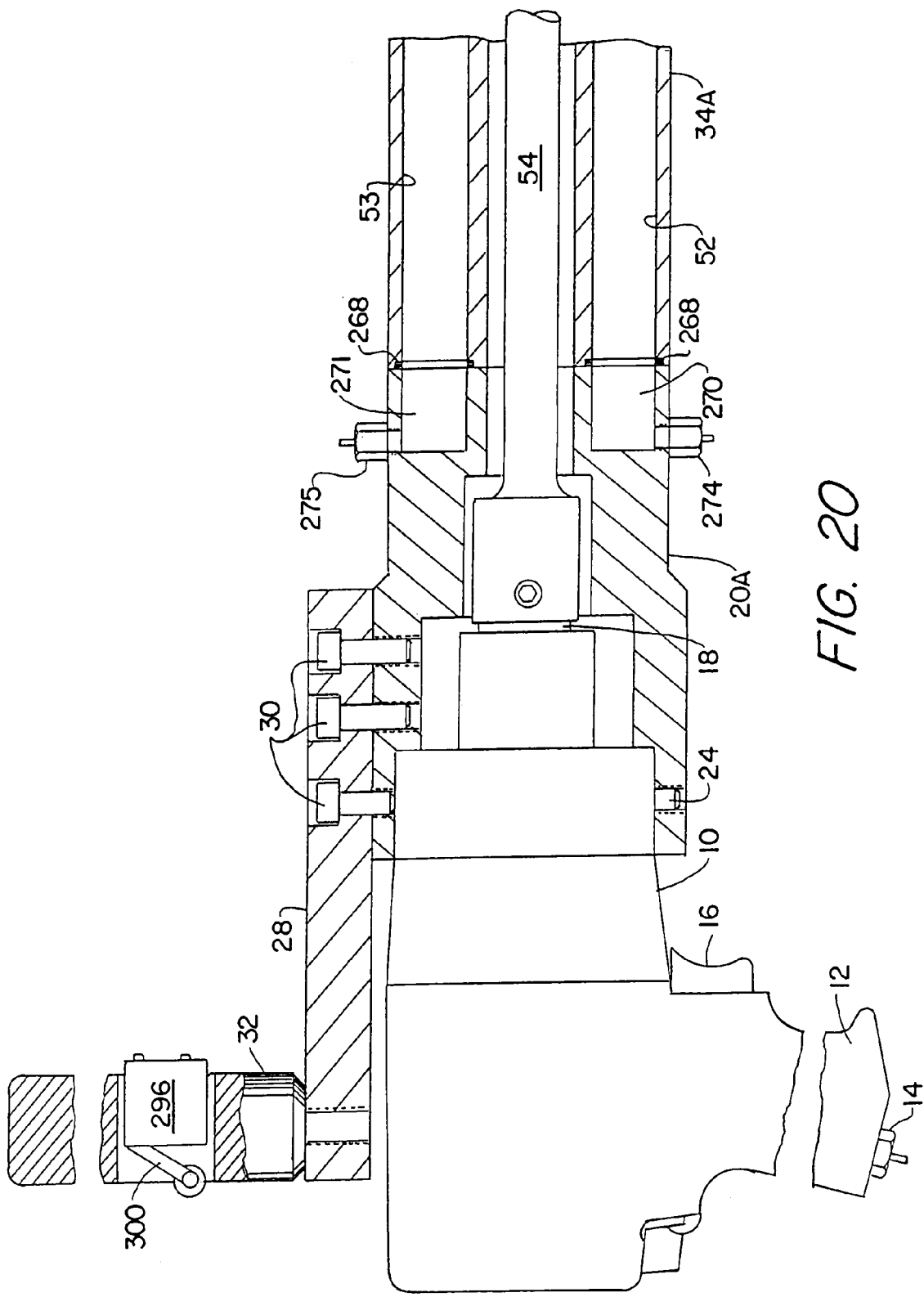
FIG. 20 is a fragmentary sectional view of the apparatus shown in FIGS. 18 and 19.
Figure 21:
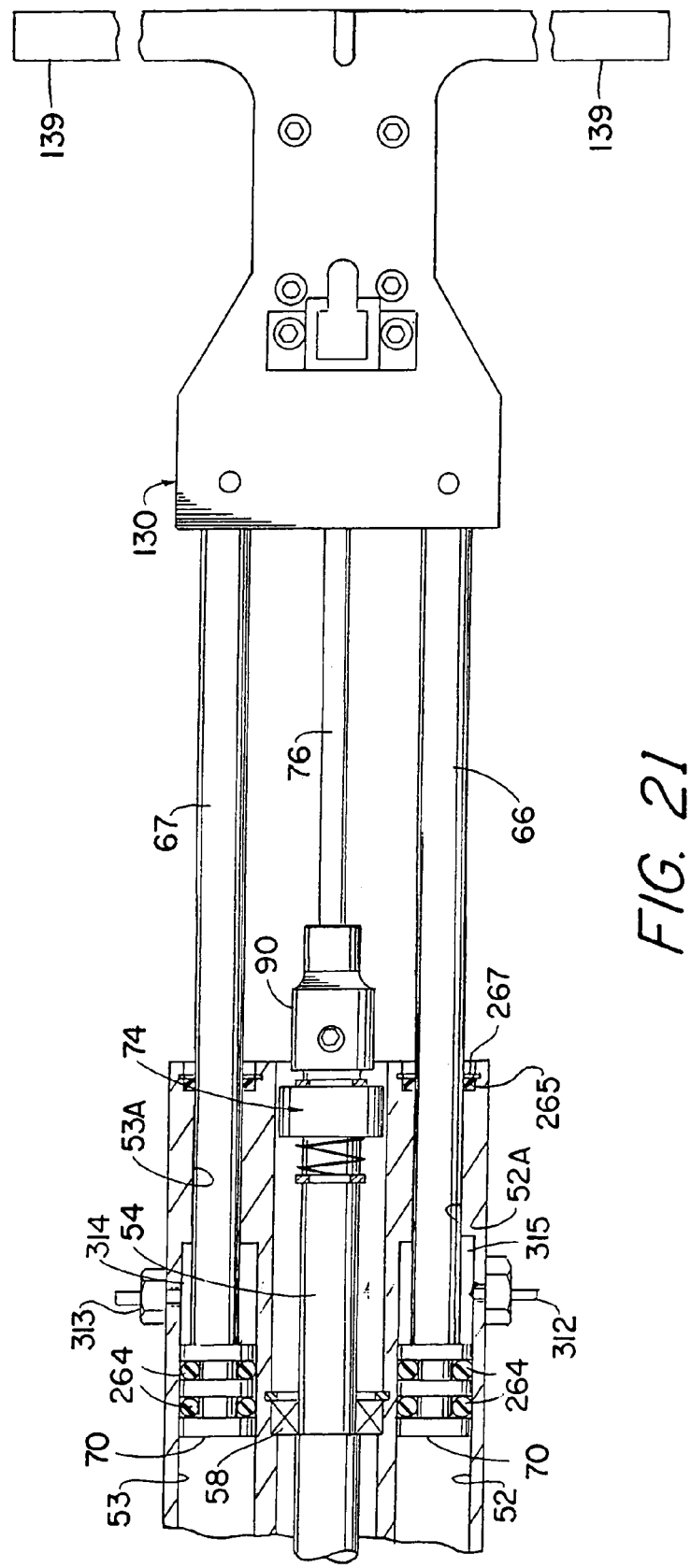
FIG. 21 is a fragmentary sectional view that forms an extension of FIG. 20.
Figure 24:
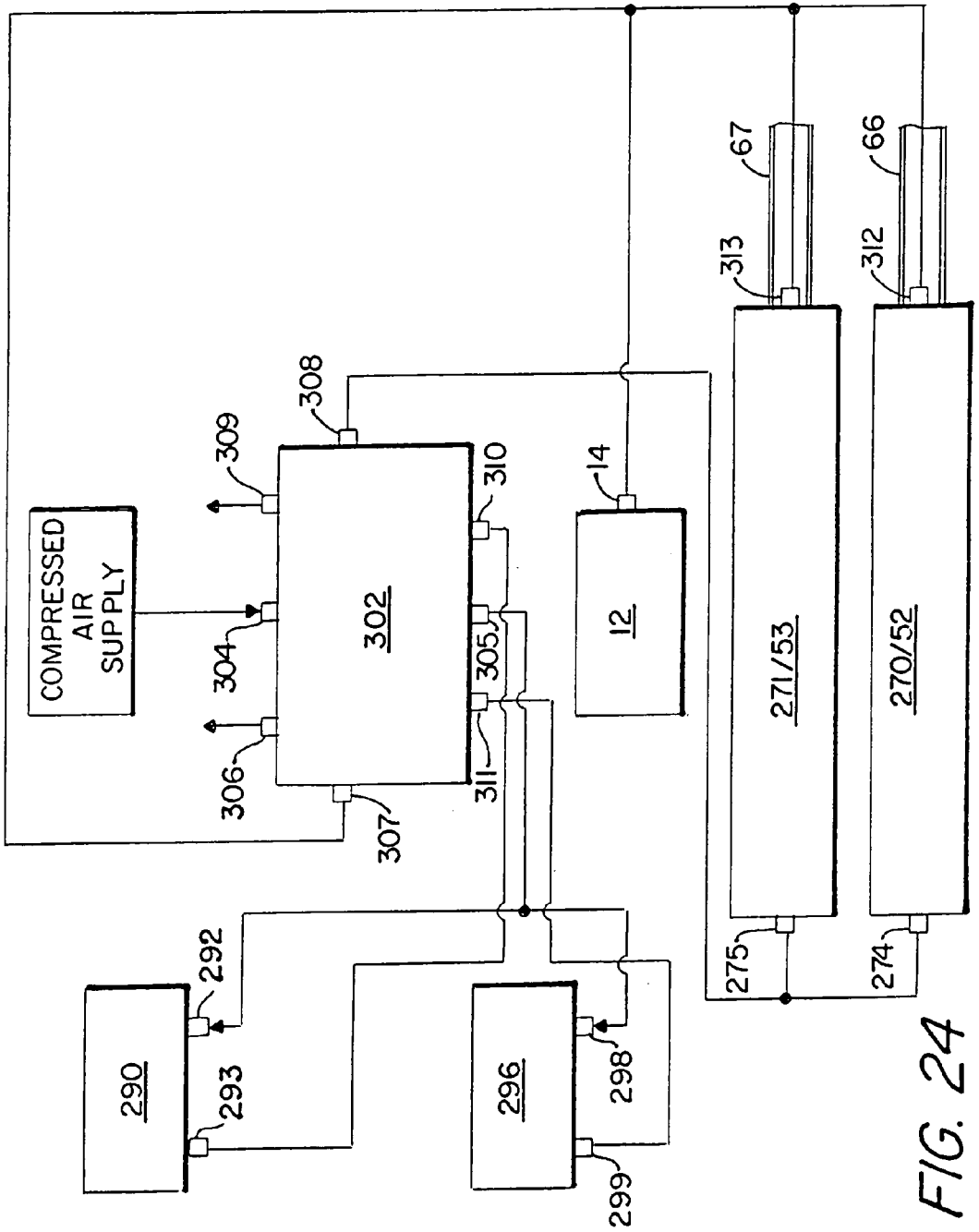
FIG. 24 is a schematic view of the pneumatic system embodied in the alternative embodiment shown in FIGS. 18-23.

Referring to FIGS. 22 and 24, housing 20A is notched to provide a recess 286 adjacent to barrel 34A, and mounted to housing 20A in that recess is a conventional pneumatic switch 290 having two ports 292, 293 and an actuating member represented schematically at 294 that is aligned with and located proximate to bore 278 in position to be engaged and depressed by push rod 280. A second conventional pneumatic switch 296 having ports 298, 299 is mounted to auxiliary handle 32 (FIG. 20). Switch 296 is mounted so that its actuating member 300 can be depressed by a finger of an operator's hand. Pneumatic switches 290 and 296 are normally open, so that air can flow from between ports 292 and 293 and between 298 and 299 only when their actuating members are depressed by push rod 280 and the operator respectively.

A four-way pneumatic valve 302 is attached to an outside surface of housing 20A. Like switches 290 and 296, valve 302 is of conventional construction. By way of example but not limitation, switches 290 and 296 may be like the Model PXC-M121 switches sold by Parker Hannifin of Des Plaines, Ill., and valve 302 may be like the Model No. PVDC 3422297 four-way power valve sold by Parker Hannifin. More specifically, as represented schematically in FIG. 24, valve 302 comprises an inlet port 304 adapted for connection to a source of compressed air at a selected pressure, e.g., 90 psig, a flow-through port 305 connected to inlet port 304, four exit ports 306, 307, 308 and 309, and two control signal valve ports 310 and 311, respectively. The valve is arranged for shifting air flow from one to the other of exit ports 306 or 307, and from one to the other of ports 308 and 309, depending on the air pressure levels at control signal ports 310 and 311. Valve ports 306 and 309 are open to the atmosphere and serve as exhaust ports. Valve port 307 is connected via a suitable flexible hose or plastic tubing (not shown) to the inlet fitting 14 of pneumatic driver 12 and to hose connectors 312 and 313. Valve port 308 is connected by similar hose lines or plastic tubing to hose connectors 274 and 275 for cylinder bores 52/270 and 53/271, respectively. Valve port 305 is connected by similar conduit means to port 292 of switch 290 and port 298 of switch 296. Port 293 of switch 290 and port 299 of switch 296 are similarly connected to control signal valve ports 310 and 311 respectively.

Operation of this preferred embodiment is now described in relation to the apparatus being in a vertical position with positioning plate 130 and magazine 6 resting on the top surface of a hard wood panel 350 (FIG. 26) overlying a high tensile strength steel substrate 352. Upon connecting inlet port 304 to a regulated compressed air supply, e.g., a portable air compressor unit, valve 302 assumes a first state in which port 307 is connected to exhaust port 306 and port 308 is connected to inlet port 304, whereupon pressurized air is conveyed to the two cylinders comprising bores 52 and 270 and bore 53 and 271, thereby exerting a pneumatic force on piston heads 70 which causes slide rods 66 and 67 to be forced outwardly of barrel 34A. This outwardly extending movement of the slide rods relative to housing 20A and barrel 34A has the effect of raising tool 2 and tool bit 76 to a standby position wherein the tool bit is spaced above the fasteners that are delivered to face plate 130 by magazine 6, essentially the same position as illustrated in FIGS. 5 and 6.

Upon closing of switch 296 by the operator, compressed air will flow out through port 299 to valve port 311, whereupon the increased pressure at port 311 will cause the valve to change states, with port 308 now connected to exhaust port 309 and port 307 now connected to inlet port 304. This results in exhaustion of pressurized air from the two cylinder bores (52/270 and 53/271) via hose connectors 274 and 275 and ports 308 and 309 of valve 302 and application of pressurized air to the same cylinder bores via valve port 307 and hose connectors 312 and 313 respectively, thereby forcing slide rods 66 and 67 to move inwardly of barrel 34A and forcing the tool downward to bring the tool bit into firm engagement with the recessed head of the fastener located inside of position plate 130. When trigger 16 of pneumatic driver 12 is depressed, it allows compressed air supplied via valve port 307 to operate the driver causing the tool bit to rotate to drive the fastener with which it is engaged in the manner previously described.

As with the first embodiment shown in FIGS. 1-13, trigger 16 of driver 2 may be depressed to operate the driver, before or after the tool bit has contacted the lead fastener 8 located within positioning plate 130. Push rod 280 is set so that it engages and depresses the actuating member 300 of switch 290 just as the fastener becomes fully seated in the top layer of the wood/metal substrate, whereupon switch 290 changes state, causing its port 292 to be connected to its port 293 and thereby allowing high pressure air to be sent as a signal to valve port 310. The application of high pressure air at port 310 causes valve 302 to reverse states so that port 307 is again connected to exhaust port 306 and port 308 is again connected to inlet 304, whereupon (a) pressurized air is reapplied to cylinder bores 270, 52 and 271, 53 to raise tool bit 76 to its original standby position and (b) flow of pressurized air to the driver is terminated causing the driver to stop rotating the tool bit even though trigger 16 is still depressed.

The primary advantage of the preferred embodiment is that, unlike the other embodiment shown in FIGS. 1-13, no downward pressure needs to be exerted by the operator to bring the tool bit into engagement with the fastener to be driven, thereby reducing operator fatigue. A second advantage of the preferred embodiment over the embodiment of FIGS. 1-13 is that the driver stops driving the fastener automatically when the fastener has been driven to the desired depth, thereby preventing premature wearing or shearing of the tool bit (a time and cost savings) and assuring consistent depth of penetration of the fasteners into the wood/metal substrate. A significant advantage results from the two foot rests 139. When a fastener is being driven into a flooring panel or other structural member that is to be fastened to an underlying substrate, there is a reactive force that tends to lift the face plate 130 up out of engagement with the underlying surface. The foot rests 139 allow the operator's weight to be utilized to keep the faced plate against the surface into which the fastener is to be driven. Otherwise the operator would have to use his arms to achieve the same result, but this is more tiresome.

Another important advantage is that the apparatus may accommodate fasteners of different sizes, and also that one size plastic strip may be used to support fasteners of like diameter but different lengths. A further important advantage is that fasteners which have been applied by the driver apparatus herein described and illustrated, e.g., to secure flooring members to a substrate, may be removed by a powered screw driver, or an impact wrench fitted with a suitable tool bit, operating in an unscrewing mode. This is of particular importance in the case of repairs to trailer bodies that involve removal of hard wood floor or wall paneling.

It is to be noted that the method of this invention may be practiced without using telescoping torque and impact transmitting unit 4 and the magazine 6. More specifically and by way of example, the method of the invention may be practiced by using a pneumatic rotary impact driver of the type described having a tool chuck and a tool bit mounted in the tool chuck, and using that driver/tool bit apparatus to drive fasteners that are positioned on the wood/metal substrate manually or by some convenient fastener-supporting means. However, that mode of practicing the invention is more limiting than the preferred mode with respect to operator fatigue and productivity. Another advantage of the invention is that it is not limited to attaching wood floor and wall panels to metal substrates but may be used to attach other structural components to one another. Thus, for example, the substrate may take the form of an I-beam, a U-channel member or an angle iron member, or a flat metal plate. Other advantages of the invention will be obvious to persons skilled in the art.

The invention is susceptible of other modifications. For one thing, the pneumatic system described above may be modified by providing for pneumatic driving action only in one direction, namely, to extend the slide rods so as to raise the pneumatic driver. This involves elimination of hose connectors 312 and 313 and the corresponding side openings in the cylinder bores and connecting valve port 307 only to inlet fitting 14 of pneumatic driver 12. With such modification, applying high pressure air to inlet port 304 will result in extension of slide rods 66 and 67, while depressing actuating member 300 will close switch 296 and thereby cause valve 302 to change states, whereupon pressurize air will flow in a direction that allows slide rods 66 and 67 to retract and cause the tool to drop under the influence of gravity to bring the tool bit into engagement with the lead fastener delivered by the magazine. However, this modified form of the apparatus has been found to be more tiring to use than the preferred embodiment. It is contemplated also that some other form of pneumatic control system may be designed to provide the same mode of operation as the apparatus herein described. Of course, the pneumatic impact driver 2 may be replaced by an electrically powered impact driver, in which case the pneumatic control system would be modified to coact with that driver. Still other modifications of the invention will be obvious to persons skilled in the art from the foregoing description and the attached drawings.

What is claimed is:

1. A method of attaching a first relatively soft structural member made of a hard wood to a second underlying relatively hard structural member made of a high tensile strength steel, said method comprising the steps of:
    (a) providing a plastic strip and a plurality of screw fasteners mounted in said plastic strip, said plastic strip comprising a longitudinally-extending straight series of evenly spaced holes with each hole having a plurality of inwardly facing circumferentially-spaced ribs, and each of said screw fasteners comprising a shank that is surrounded and gripped by said circumferentially-spaced ribs and comprises a head at one end, a tapered point at the opposite end, a drill portion that extends away from said tapered point for a fixed distance, a screw portion commencing from adjacent said drill portion and extending toward said screw head, said drill portion having a trailing end adjacent to said screw portion, and at least two blades located at said trailing end of said drill portion, said blades projecting laterally from said screw fastener and having a radius greater than the maximum radii of said drill and screw portions, said head having cutting edges on a side thereof facing said shank;
    (b) positioning said strip so that the first-in-line of said screw fasteners is located in axial alignment with the rotatably drivable screw driver bit of a powered rotary screw driver apparatus;
    (c) engaging the head of said first-in-line screw fastener with said screw driver bit and operating said screw driver apparatus so as to cause said screw driver bit to rotatively expel said screw fastener out of said plastic strip and rotatively drive said fastener through said relatively soft structural member into said relatively hard structural member, with said cutting edges cutting away said ribs as said screw fastener is rotatively driven in a direction to expel it from said plastic strip and the driving of said fastener into said relatively hard structural member comprising first rotating said fastener to cause said drill portion to penetrate said relatively soft structural member in a drilling action and then, when said fastener has engaged said relatively hard structural member, repetitively impacting said fastener while simultaneously subjecting it to rotational torque, whereby to cause said fastener to penetrate said relatively hard structural member and lock said relatively soft structural member to said to relatively hard structural member;
    (d) disengaging said screw driver bit from said first-in-line screw fastener;
    (e) advancing said strip so as to locate the next-in-line screw fastener in axial alignment with said screw driver bit;
    (f) repeating step (c) to drive said next-in-line screw fastener through said relatively soft structural member into said relatively hard structural member;
    (g) disengaging said screw driver bit from said next-in-line screw fastener; and
    (h) repeating steps (b) to (d) as many times as required to complete attachment of said relatively soft structural member to said underlying relatively hard structural member made of metal.

2. The method according to claim 1 wherein said plastic strip is formed so as to define a series of carriers each characterized by one of said holes, and further wherein step (c) involves driving said fasteners out of said carriers without separating said carriers from one another.

3. The method according to claim 1 wherein said plastic strip has a top surface and a bottom surface, and the said ribs at each hole have inner edges that coact to define an opening having a smaller diameter than said each hole, and further wherein at each of said holes said plastic strip comprises a plurality of webs that extend between said ribs at said top surface, said webs having inner edges that are aligned with the inner edges of said ribs, said webs and said ribs being cut away by said cutting edges as said fasteners are driven to expel them from said plastic strip and into fastening relation with said relatively soft structural member and said underlying relatively hard structural member made of metal.

4. The method according to claim 3 wherein said fastener heads extend above and are spaced from said top end surface of said plastic strip, and further wherein said fastener heads have a maximum diameter that is greater than the diameter of said openings defined by said ribs but does not exceed the diameter of said holes, whereby to facilitate expelling said fasteners lengthwise out of said plastic strip responsive to rotational forces applied to said heads of said fasteners.

5. The method according to claim 1 wherein said power screw driver apparatus comprises a driver having an output spindle and means for supporting said screw driver bit in coaxial relation with said spindle, a positioning plate for engaging said first structural member, said positioning plate having a top and bottom end surfaces and a fastener drive bore extending between and through said top and bottom surfaces coaxially with said spindle, a magazine attached to said positioning plate having means for slidably holding said strip with said fasteners and means for advancing said plastic strip so as to position the first-in-line fastener in said fastener drive bore, and telescoping means coupling said positioning plate to said driver so that said driver and said spindle can be moved toward and away from said top end surface of said positioning plate;

said method further comprising the steps of engaging said positioning plate with said first structural member that is to be attached to said second underlying structural member, and using said telescoping means to move said driver and spindle toward said positioning plate and said first structural member whereby to bring said screw driver bit into engagement with the head of the first-in-line fastener positioned in said fastener drive bore, so that operation of said driver will cause said fastener to be driven through said first structural member into said second structural member under the rotational and impact forces transmitted to said spindle by said driver.

6. The method according to claim 5 further comprising the step of using said telescoping means to move said driver and spindle away from said positioning plate after a fastener has been driven out of said strip into said first and second structural members.

7. The method according to claim 6 wherein said driver apparatus comprises pneumatic means for pneumatically causing said telescoping means to move said driver toward and away from said positioning plate, and further where after each step (c) said pneumatic means is operated to cause said telescoping means to move said driver away from said positioning plate.

8. A method of attaching a first relatively soft structural member made of a hard wood to a second underlying relatively hard structural member made of a high tensile strength steel, said method comprising the steps of:

(a) providing a plastic strip and a plurality of screw fasteners mounted in said plastic strip, said plastic strip comprising a longitudinally-extending straight series of holes with each hole having a plurality of inwardly facing circumferentially-spaced ribs, and each of said screw fasteners comprising a shank that is surrounded and gripped by said circumferentially-spaced ribs and comprises a head at one end, a tapered point at the opposite end, a drill portion that extends away from said tapered point for a fixed distance, a screw portion commencing from adjacent said drill portion and extending toward said head, said drill portion having a trailing end adjacent to said screw portion, and at least two blades located at said trailing end of said drill portion, said blades projecting laterally from said screw fastener and having a radius greater than the maximum radii of said drill and screw portions, and said head of each fastener having cutting edges facing in the direction of said tapered point;

(b) providing a powered screw driver apparatus comprising a driver having an output spindle and means coaxially securing a screw driver bit to said spindle, a positioning plate for engaging said first structural member, said positioning plate having a top and bottom end surfaces and a fastener drive bore extending between and through said top and bottom surfaces coaxially with said spindle, and telescoping means coupling said positioning plate to said driver so that said driver and said spindle can be moved toward and away from said top end surface of said positioning plate;

(c) positioning said strip so that the first-in-line of said screw fasteners is located in said fastener driver bore in axial alignment with said spindle and screw driver bit;

(d) engaging said positioning plate with said first structural member while said second structural member underlies said first structural member;

(e) using said telescoping means to move said driver and spindle toward said positioning plate and said first structural member whereby to bring said screw driver bit into engagement with the head of the first-in-line screw fastener positioned in said fastener drive bore; and (f) before, or during or after, said screw driver bit has engaged the head of the first-in-line screw fastener, operating said driver so as to cause it to rotate said screw driver bit in the direction required to drive said fasteners in a screw-in direction;

(g) while said screw driver bit is rotating in a screw in direction simultaneously using said telescoping means to move said driver further toward said first structural member whereby operation of said driver will cause said first-in-line screw fastener to be expelled from said plastic strip and driven through said first structural member into said second structural member under the rotational force transmitted to said spindle by said driver, with said cutting edges cutting away said ribs as said each fastener is rotatively driven in said screw-in direction, said drill portion acting to penetrate said relatively soft structural member and said relatively hard structural member and said screw portion acting to cut a screw thread in said relatively hard structural member, whereby said fastener locks said relatively soft structural member to said to relatively hard structural member;

(h) terminating operation of said driver and using said telescoping means to move said driver away from said positioning plate;

(i) re-positioning said strip so as to advance the next-in-line of said screw fasteners into axial alignment with said spindle and said screw driver bit, whereby said next in line fastener is ready to be driven according to steps (d) to (h).

9. The method according to claim 8 wherein said strip with said fasteners is supported by a magazine disposed adjacent to and in fixed relation with said positioning plate, and said strip is positioned and re-positioned according to step (c) and (i) by means forming part of said magazine.

10. The method according to claim 8 wherein each fastener head has a tapered bottom surface facing said shank, and said cutting edges are formed as integral portions of said tapered bottom surface.

11. The method according to claim 10 wherein said cutting edges cut a countersink in said first relatively soft structural member as said fastener is being driven into locking relation with said second relatively hard structural member, and operation of said driver is terminated automatically when said screw fastener is driven far enough for its head to be fully accommodated by said countersink.

12. A method of attaching a relatively soft structural member to an underlying relatively hard structural member made of metal, said method comprising the steps of:

(a) providing a plastic strip having a plurality of holes evenly spaced from one another along the length of said strip with each hole being characterized by a plurality of inwardly facing circumferentially-spaced ribs, and a plurality of screw fasteners mounted in said holes and gripped by said ribs, each of said fasteners comprising a shank having a head with a tapered bottom surface at one end, a tapered point at the opposite end, a drill portion that extends away from said tapered point for a fixed distance, a screw portion commencing from adjacent said drill portion and extending toward said head, said drill portion including at least two cutting blades located adjacent to said screw portion with said cutting blades projecting laterally with a radius greater than the maximum radii of said drill and screw portions, and a tapered bottom surface having a plurality of circumferentially-spaced projecting cutting edges;

(b) positioning said strip so that the first-in-line of said fasteners is in position to be driven to be engaged by a screw driver bit of a powered rotary screw driver and driven by said bit into said relatively soft structural member and said underlying relatively hard structural member;

(c) engaging said first-in-line of said fasteners with said screw driver bit while said strip is restrained against movement in a direction parallel to the rotational axis of said screw driver bit and operating said rotary screw driver in a screw-in direction while exerting an axial force on said driver in the direction of said first-in-line fastener, whereby to cause said first-in-line fastener to be expelled from said strip and driven through said relatively soft structural member into said relatively hard structural member under the rotational force exerted by said rotary screw driver, with said cutting edges acting first to cut away said ribs and then acting to cut a countersink in said relatively soft structural member as said first-in-line fastener is driven in said screw-in direction, said drill portion acting to drill holes in turn in said relatively soft and hard structural members, and said screw portion acting to cut a screw thread in said relatively hard structural member, whereby said first-in-line fastener locks said relatively soft structural member to said relatively hard structural member (d) terminating operation of said driver and withdrawing said driver to disengage said tool bit from said first-in-line fastener; and (e) repeating steps (b) to (d) to drive successive into said relatively soft and relatively hard structural members.

* * * * *

UNITED STATES PATENT AND TRADEMARK OFFICE
CERTIFICATE OF CORRECTION

PATENT NO.       : 7,377,019 B2
APPLICATION NO.  : 11/168852
DATED            : May 27, 2008
INVENTOR(S)      : Harry M. Haytayan It is certified that error appears in the above-identified patent and that said Letters Patent is hereby corrected as shown below:

Column 18, line 26 (first line of paragraph (g)), change "screw in" to -- screw-in --; and Column 20, line 26 (first line of paragraph (e)), add the word -- fasteners -- before the word "into".

Signed and Sealed this

Fifth Day of August, 2008

JON W. DUDAS
*Director of the United States Patent and Trademark Office*